US009207859B2

(12) United States Patent
Woo et al.

(10) Patent No.: US 9,207,859 B2
(45) Date of Patent: Dec. 8, 2015

(54) METHOD AND MOBILE TERMINAL FOR DISPLAYING FIXED OBJECTS INDEPENDENT OF SHIFTING BACKGROUND IMAGES ON A TOUCHSCREEN

(75) Inventors: Seunghyun Woo, Seoul (KR); Yongdeok Lee, Goyang-si (KR); Kange Lee, Seoul (KR); Shinhae Lee, Seoul (KR); Jinhwan Jung, Seoul (KR); Kunho Lee, Seoul (KR); Hayang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 931 days.

(21) Appl. No.: 13/084,161

(22) Filed: Apr. 11, 2011

(65) Prior Publication Data

US 2012/0062549 A1  Mar. 15, 2012

(30) Foreign Application Priority Data

Sep. 14, 2010 (KR) .................. 10-2010-0090085
Oct. 1, 2010 (KR) .................. 10-2010-0095767

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/04815* (2013.01); *G06F 3/04817* (2013.01); *G06F 3/04845* (2013.01)

(58) Field of Classification Search
CPC ............ G06F 3/04817; G06F 3/04883; G06F 3/0486; G06F 3/0481; G06F 3/0488; G06F 2203/04808; G06F 3/03547

USPC .......................................... 715/848
See application file for complete search history.

(56) References Cited

U.S. PATENT DOCUMENTS

2003/0043114 A1  3/2003  Silfverberg et al.
2003/0128242 A1*  7/2003  Gordon .................. 345/848
(Continued)

FOREIGN PATENT DOCUMENTS

CN  1455611 A  11/2003
CN  1549998 A  11/2008
(Continued)

OTHER PUBLICATIONS

"T-Mobile G1 User Manual", pp. 1-113, May 27, 2009.*
(Continued)

*Primary Examiner* — Jennifer To
*Assistant Examiner* — Joseph R Burwell
(74) *Attorney, Agent, or Firm* — Birch, Stewart, Kolasch & Birch, LLP

(57) ABSTRACT

A mobile terminal and controlling method thereof are disclosed. A plurality of moveable objects are displayed on a touchscreen of the mobile terminal. A background image is displayed as a background of the plurality of objects. In response to user selection of a specific object among the plurality of objects after an object edit mode is entered, the specific object is set to an independent type object, and another object of the plurality of objects is set to a dependent type object. The independent type object is displayed at a specific position on the touchscreen. In response to a touch drag in a specific direction performed with respect to the background image, the background image and the dependent type object are shifted while the independent type object remains fixedly displayed at the same specific position irrespective of the shift of the background image and the dependent type object.

11 Claims, 48 Drawing Sheets

(51) Int. Cl.
*G06F 3/0481* (2013.01)
*G06F 3/0484* (2013.01)

(56) References Cited

U.S. PATENT DOCUMENTS

| | | |
|---|---|---|
| 2003/0206199 A1 | 11/2003 | Pusa et al. |
| 2005/0091596 A1* | 4/2005 | Anthony et al. ............. 715/712 |
| 2008/0225007 A1 | 9/2008 | Nakadaira et al. |
| 2008/0307364 A1* | 12/2008 | Chaudhri et al. ............ 715/836 |
| 2009/0058821 A1* | 3/2009 | Chaudhri et al. ............ 345/173 |
| 2009/0064047 A1 | 3/2009 | Shim et al. |
| 2009/0064055 A1* | 3/2009 | Chaudhri et al. ............ 715/863 |
| 2009/0178008 A1* | 7/2009 | Herz et al. .................... 715/840 |
| 2009/0303231 A1 | 12/2009 | Robinet et al. |
| 2010/0013863 A1 | 1/2010 | Harris |
| 2010/0095206 A1 | 4/2010 | Kim |
| 2011/0016433 A1* | 1/2011 | Shipley ........................ 715/849 |
| 2011/0029907 A1* | 2/2011 | Bakhash ....................... 715/769 |
| 2011/0078624 A1* | 3/2011 | Missig et al. ................ 715/802 |
| 2011/0138275 A1* | 6/2011 | Yu ................................ 715/702 |
| 2011/0138278 A1 | 6/2011 | Miyata |
| 2011/0179368 A1* | 7/2011 | King et al. ................... 715/769 |
| 2011/0246950 A1* | 10/2011 | Luna et al. .................... 715/848 |
| 2011/0271182 A1* | 11/2011 | Tsai et al. ..................... 715/702 |
| 2012/0084692 A1* | 4/2012 | Bae ............................... 715/769 |
| 2012/0284658 A1* | 11/2012 | Hirvonen ..................... 715/779 |
| 2013/0249837 A1* | 9/2013 | Liu et al. ...................... 345/173 |
| 2014/0289669 A1* | 9/2014 | Wang ............................ 715/781 |

FOREIGN PATENT DOCUMENTS

| | | |
|---|---|---|
| CN | 101308441 A | 11/2008 |
| CN | 101529364 A | 9/2009 |
| WO | WO 2007/067970 A2 | 6/2007 |
| WO | WO 2009/158310 A2 | 12/2009 |
| WO | WO 2010/050382 A1 | 5/2010 |

OTHER PUBLICATIONS

Phandroid Android forums, thread: Android Forums > Android Phones > HTC EVO 4G > "Is there a trick to get one icon/widget from one home screen to another?", http://androidforums.com/htc-evo-4g/128564-there-trick-get-one-icon-widget-one-home-screen-another.html, Jul. 20, 2010.*

* cited by examiner

METHOD AND MOBILE TERMINAL FOR DISPLAYING FIXED OBJECTS INDEPENDENT OF SHIFTING BACKGROUND IMAGES ON A TOUCHSCREEN

CROSS REFERENCE TO RELATED APPLICATIONS

Pursuant to 35 U.S.C. §119(a), this application claims the benefit of earlier filing date and right of priority to Korean Application Nos. 10-2010-0090085, filed on Sep. 14, 2010, and 10-2010-0095767 filed on Oct. 1, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

First of all, a mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as a 3D image can be implemented on a display unit of a terminal, the demand for a 3D user interface using a more convenient 3D image keeps increasing.

However, it is further necessary to increase effort to research and develop a method for facilitating a terminal user to arrange various application icons, file icons, menu icons, widgets and the like (hereinafter named objects) desired for user's taste at desired positions in the 3D user interface.

SUMMARY OF THE INVENTION

Accordingly, the present invention is directed to a mobile terminal and controlling method thereof that substantially obviate one or more problems due to limitations and disadvantages of the related art.

An object of the present invention is to provide a more convenient 3D user interface.

Another object of the present invention is to provide a mobile terminal and controlling method thereof, which facilitates a user to shift and copy an object using different 3D depths in a 3D user interface implemented as a 3D image.

A further object of the present invention is to provide a mobile terminal and controlling method thereof, which facilitates a user to shift or a plurality of objects using different 3D depths in a 3D user interface implemented as a 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display at least one portion of a 3D user interface provided with at least two icons including a first icon and a second icon, and a controller configured to: control the first icon and the second icon capable of existing with different 3D depths in the 3D user interface, respectively, when a touch command is inputted to the touchscreen, control a specific one of the first and second icons to respond to the touch command, the specific icon having a specific 3D depth corresponding to the touch command.

In another aspect of the present invention, a mobile terminal includes a touchscreen configured to display one or more objects and a first background image displayed as a background of the at least one or more objects, and a controller configured to when an object edit mode is entered from an object use mode, control each of the at least one or more objects to be set to a dependent type or an independent type, and when the first background image is shifted on the touchscreen, control at least one of the objects of the dependent type to be shifted together with the first background image but controlling at least one of the objects of the independent type to be fixedly displayed on the touchscreen irrespective of the shift of the first background image.

In another aspect of the present invention, a method of controlling a mobile terminal according to the present invention includes displaying at least one portion of a 3D user interface provided with at least two icons including a first icon and a second icon on a touchscreen, controlling the first icon and the second icon capable of existing with different 3D depths in the 3D user interface, respectively, and when a touch command is inputted to the touchscreen, controlling a specific one of the first and second icons to respond to the touch command, the specific icon having a specific 3D depth corresponding to the touch command.

In a further aspect of the present invention, a method of controlling a mobile terminal according to the present invention includes displaying one or more objects and a first background image displayed as a background of the at least one or more objects on a touchscreen, when an object edit mode is entered from an object use mode, controlling each of the at least one or more objects to be set to a dependent type or an independent type, and when the first background image is shifted on the touchscreen, controlling at least one of the objects of the dependent type to be shifted together with the first background image but controlling at least one of the objects of the independent type to be fixedly displayed on the touchscreen irrespective of the shift of the first background image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
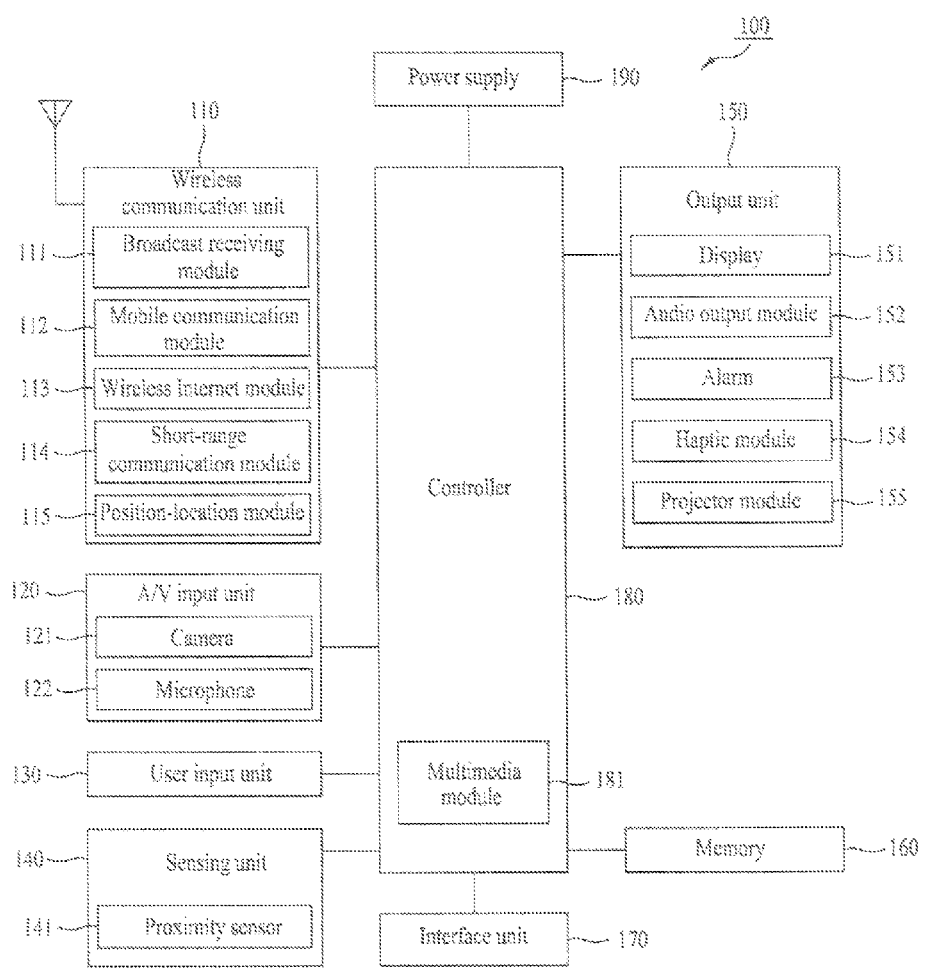
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
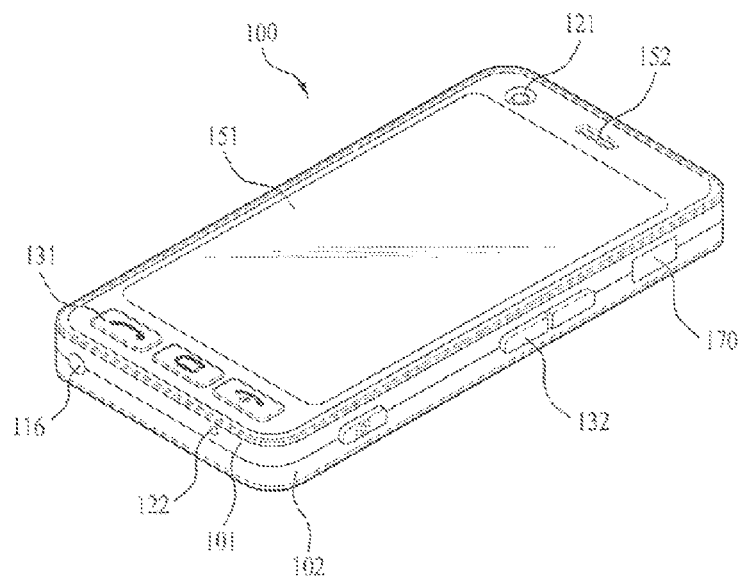
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
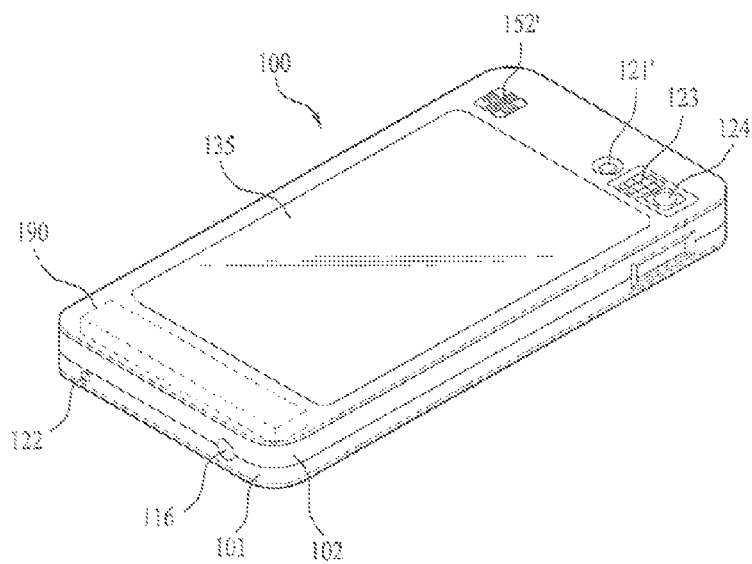
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 is explained with reference to FIG. 3 as follows.

FIG. 3A is a front-view diagram of a terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

Figure 3:
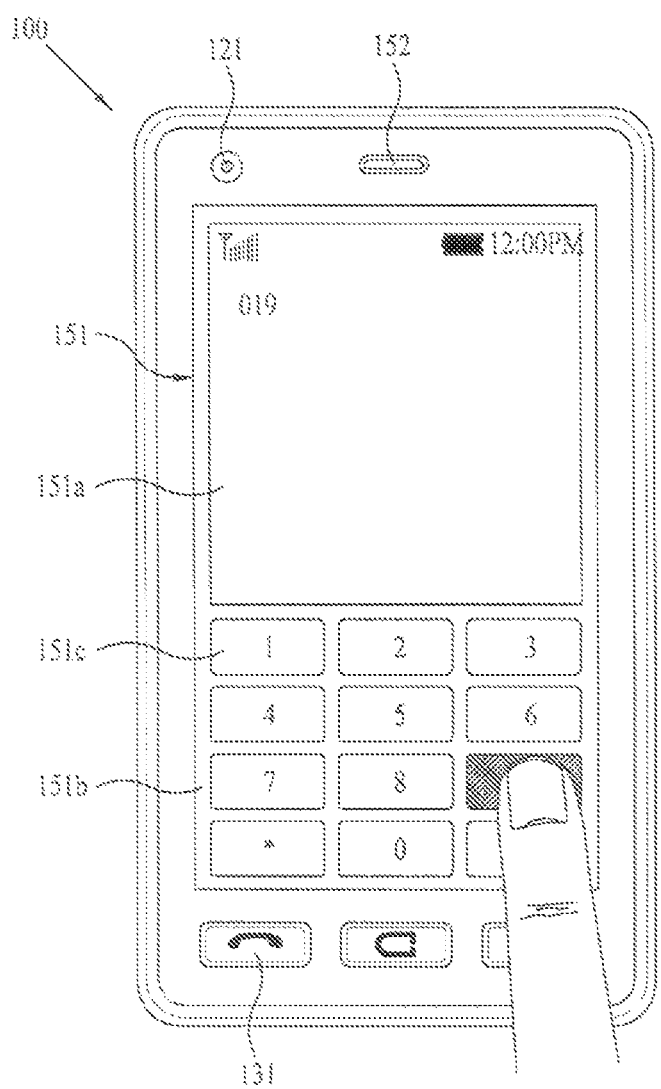
FIG. 3 is a front diagram of a mobile terminal according to one embodiment of the present invention for explaining one operational status of the mobile terminal, respectively.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
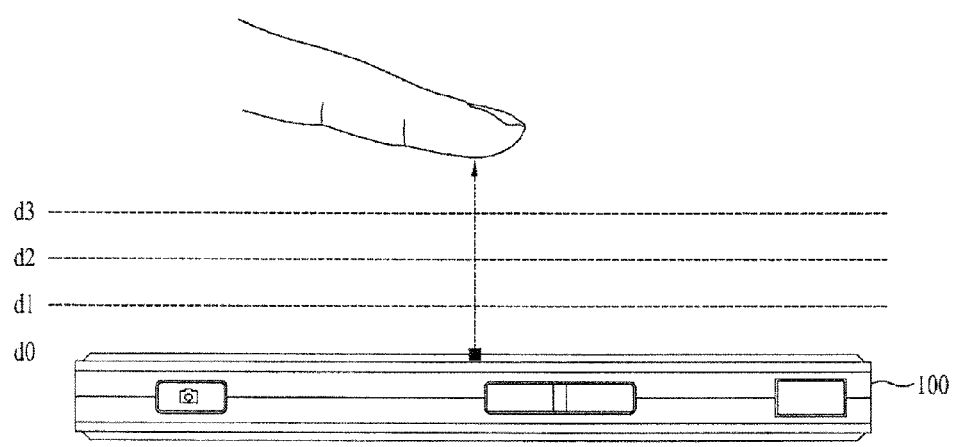
FIG. 4 is a diagram to explain the concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth').

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Meanwhile, it is able to display a graphic mark of an arrow or a finger type on the display unit to point at a specific object or select a specific menu. In this case, the graphic mark is generally called a pointer or a cursor. Occasionally, the pointer can mean such a touch means used for a touch manipulation and the like as a finger, a stylus pen and the like. That is, the pointer generally means the graphic mark or can mean the touch means occasionally. Therefore, to clearly discriminate the meanings of the graphic mark and the touch means in this disclosure, the graphic mark and the touch means shall be named a cursor and a pointer, respectively.

Moreover, a contact touch, a proximity touch, a touch & drag, a touch flicking, a long touch, a multi-touch or a multi-tap mentioned in the following description shall go by the name of a touch gesture.

In the following description, a method of displaying a 3D image in a mobile terminal applicable to embodiments of the present invention and a display unit configuration for the same are explained.

3D images implemented on the display unit 151 of the mobile terminal 100 according to the present invention can be mainly classified into two kinds of categories, (i.e., a first category and a secondary category as is described in further detail below). In this case, the reference for this classification is attributed to whether different images are provided to both eyes, respectively.

First of all, the first category is a monoscopic type of providing the same image to both eyes and is advantageous in being implemented with a general display unit. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151.

Secondly, the second category is a stereoscopic type of providing different images to both eyes, respectively, which uses the principle that a user can sense a 3D effect in looking at an object with human eyes. In particular, human eyes are configured to see different planar images in looking at the same object due to a spaced distance between both eyes. These different planar images are forwarded to a human brain via retinas. The human brain is then able to sense depth and reality of a 3D image by combining the different planar images together. And, the binocular disparity attributed to the spaced distance between both of the eyes enables the user to sense the 3D effect despite that there is an individual difference of the binocular disparity more or less. Therefore, the binocular disparity becomes the most important factor of the second category. The binocular disparity is explained in detail with reference to FIG. 5 as follows.

Figure 5:
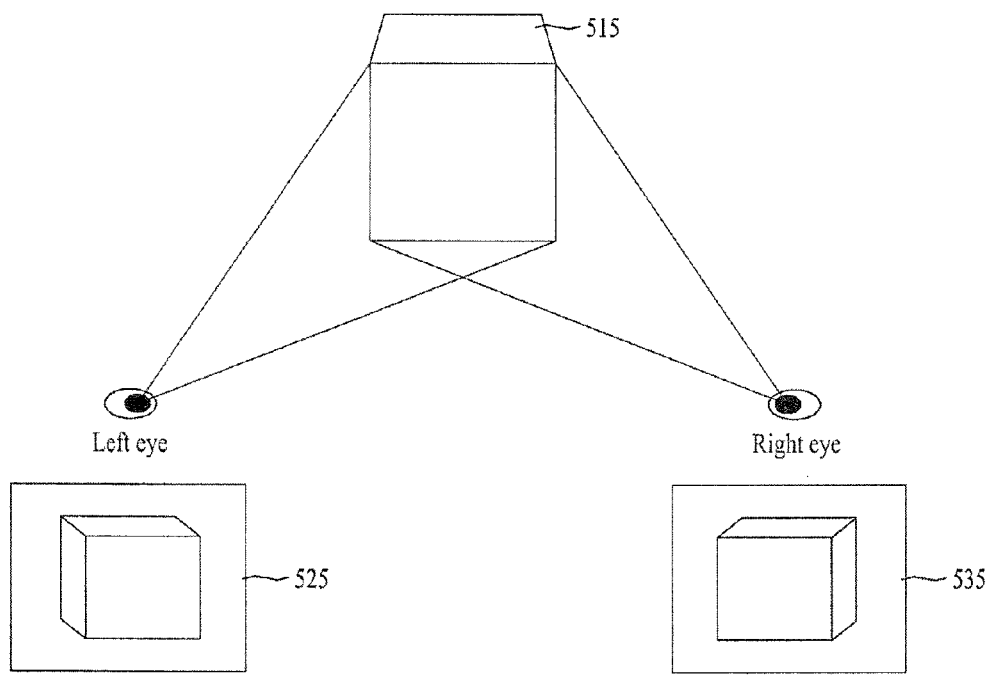
FIG. 5 is a diagram for describing the principle of binocular disparity.

FIG. 5 is a conceptional diagram for explaining the principle of the binocular disparity.

Referring to FIG. 5, assume a situation that a hexahedron 515 is positioned as a subject in front below an eye's height to be seen through human eyes. In this case, a left eye is able to see a left eye planar image 525 revealing three facets including a top side, a front side and a left lateral side of the hexahedron 515 only. And, a right eye is able to see a right eye planar image 535 revealing three facets including the top side, the front side and a right lateral side of the hexahedron 515 only.

Even if a real thing is not actually positioned in front of both eyes of a user, if the left eye planar image 525 and the right eye planar image 535 are set to arrive at the left eye and the right eye, respectively, a user is able to substantially sense the hexahedron 515 as if looking at the hexahedron 515 actually.

Thus, in order to implement the 3D image belonging to the second category in the mobile terminal 100, left and right eye images of the same object should arrive at both eyes via the display unit in a manner of being discriminated from each other.

In order to discriminate the above-mentioned two categories from each other in this disclosure, a 3D image belonging to the first category shall be named 'monoscopic 3D image' and a 3D image belonging to the second category shall be named 'stereoscopic 3D image'.

A method of implementing a stereoscopic 3D image is described as follows.

First of all, as mentioned in the following description, in order to implement a stereoscopic 3D image, an image for a right eye and an image for a left eye need to arrive at both eyes in a manner of being discriminated from each other, which can be implemented by one of 'parallax barrier scheme', 'lenticular lens scheme', polarizing glasses scheme', 'active shutter scheme' and the like as follows.

The parallax barrier scheme enables different images arrive at both eyes in a manner of controlling a propagating direction of light by electronically driving a cutoff device provided between a general display and both eyes.

A structure of a parallax barrier type display unit 151 for displaying a stereoscopic 3D image can be configured in a manner that a general display device is combined with switch LC (liquid crystals). A propagating direction of light is controlled by activating an optical parallax barrier using the switch LC, whereby the light is separated into two different lights to arrive at left and right eyes, respectively. Thus, when an image generated from combining an image for the right eye and an image for the left eye together is displayed on the display device, a user sees the images respectively corresponding to the eyes, thereby feeling as if the images are 3-dimensionally displayed.

Alternatively, the parallax barrier attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

Besides, although the parallax barrier provides a stereoscopic 3D image with reference to a single axis in general, the present invention is able to use a parallax barrier that enables parallel translation in at least two axial directions according to a control signal from the controller 180.

Secondly, the lenticular scheme relates to a method of using a lenticular screen provided between a display and both eyes. In particular, a propagating direction of light is refracted via lens on the lenticular screen, whereby different images arrive at both eyes, respectively.

Thirdly, according to the polarized glasses scheme, polarizing directions are set different from each other to provide different images to both eyes, respectively.

Fourthly, the active shutter scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

For clarity and convenience of the following description, assume that a mobile terminal mentioned in the following description includes at least one of the former components shown in FIG. 1. Specifically, a mobile terminal, to which the present invention is applicable, includes a display unit configured to provide a 3D image to a user via at least one of the above mentioned 3D image implementing schemes.

A mobile terminal according to one embodiment of the present invention is able to provide a 3D user interface using a plurality of layers having different 3D depths in a virtual 3D space.

In the following description, a layer structure applicable to embodiments of the present invention is explained with reference to FIGS. 6A to 6C.

Figure 6A:
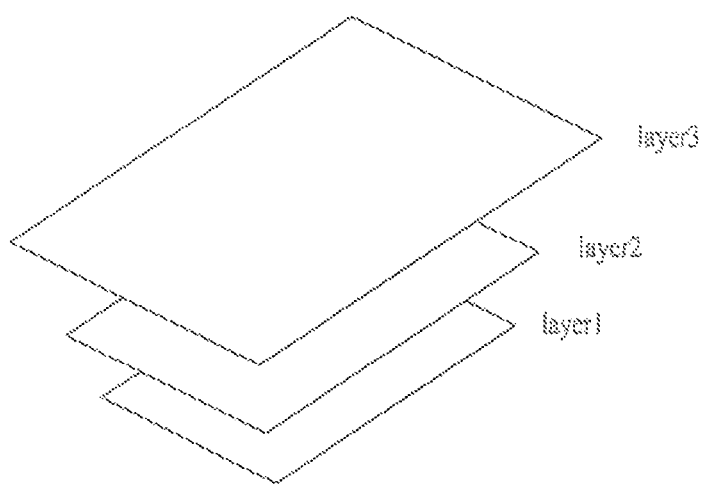
FIGS. 6A to 6C are diagrams for examples of a layer arrangement structure applicable to embodiments of the present invention.
Figure 6B:
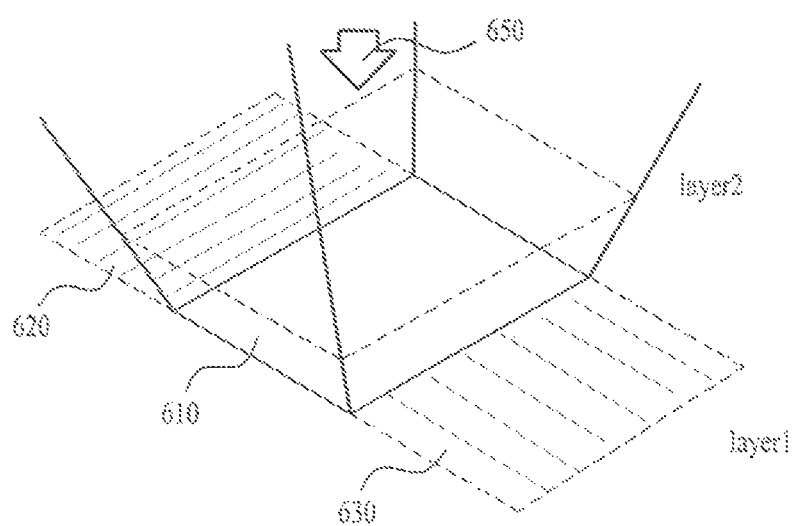
Figure 6C:
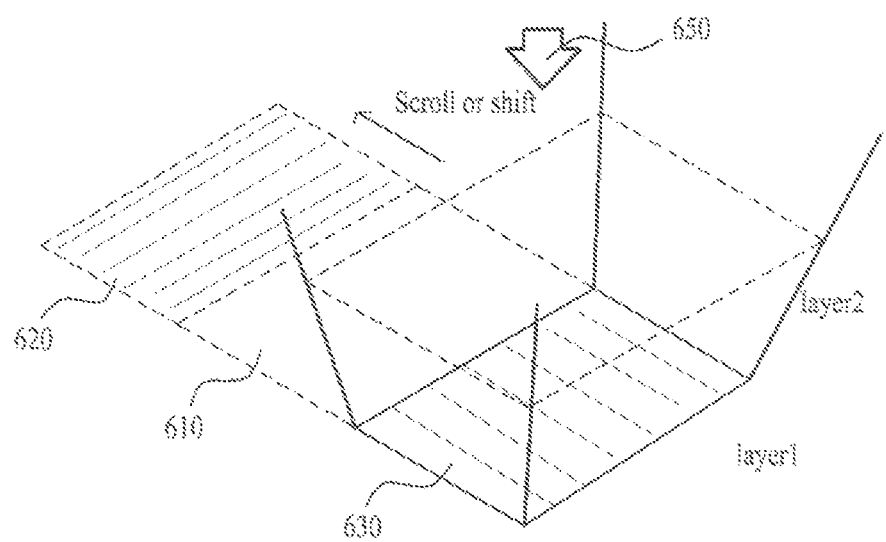

FIGS. 6A to 6C are diagrams for examples of a layer arrangement structure applicable to embodiments of the present invention.

Although display configuration diagrams (FIG. 6 included) in the following description are depicted using planar images due to the limited representation of the drawings, assume that 3D images are provided to a user by the above-mentioned 3D implementing schemes in the display configuration diagrams.

Referring to FIG. 6A, total 3 layers including first to third layers can be arranged in a virtual 3D space in a manner of being stacked on one another by leaving a prescribed space in-between. In particular, the layers can be stacked on one another in a manner of being horizontal to a plane of the display. As the three layers are exemplarily provided in the drawing, two layers or at least four layers can be arranged as well. When these layers are implemented into a 3D image via the display unit 15, the third layer is arranged on the top in user's viewpoint and has a shallow 3D depth. Therefore, the user is able to sense that the third layer is situated closest to the user. The second layer and the first layer are consecutively arranged under the third layer in order and have considerable 3D depths, respectively. Therefore, the user is able to sense that the second and first layers are situated further consecutively distant from the user.

A prescribed transparency can be set for each of the layers. For instance, in case that all layers are set semitransparent, a user is able to see all layer surfaces of the first to third layers. If the second layer is non-transparent only and the first and third layers are semitransparent, a user is able to see a surface of the semitransparent third layer and a surface of the second layer through the third layer only and may not be able to see a surface of the first layer.

Through a prescribed command input via the user input unit, the arranged positions and/or 3D depths of the layers are changeable. A command input for manipulating the layers can be performed using one of the camera 121 for photographing a position of a pointer (e.g., a finger, a stylus pen, etc.), the proximity sensor 140 for recognizing a proximity distance of a pointer, the touchscreen 151 configured to distinguishably recognize a contact touch or a proximity touch and the like. The case of changing the arranged positions of the layers is described with reference to FIG. 6B and FIG. 6C.

In FIG. 6B and FIG. 6C, assume that a first layer and a second layer exist only. And, assume that the first layer includes three sublayers, i.e., a first sublayer 610, a second sublayer 620 and a third sublayer 630, each of which has a size equal to that of the second layer. In this case, the three sublayers 610, 620 and 630 are configured in a manner of connected to one another in a horizontal direction. Moreover, assume that the second layer is transparent or semitransparent.

Referring to FIG. 6B, the second layer has a size corresponding to a whole screen of the display unit. In a user's viewpoint 650, the first sublayer 610 situated in the middle of the first layer can be seen on the display unit via the second layer. In particular, although the second sublayer 620 to the left and the third sublayer 630 to the right exist in a manner of configuring the first layer in a virtual 3D space, they are not displayed on the display unit. The first sublayer 610 among the sublayers can be displayed on the display unit only.

In this case, a user is able to apply a prescribed input to change an arranged status of the first layer, i.e., a region displayed on the display unit. For instance, in case that the display unit includes the touchscreen, it is able to shift or move only the first layer in parallel through a drag or flicking touch (i.e., a touch pattern inputted in a manner of having a pointer contact with the touchscreen and then flicking away the pointer). In particular, if a user inputs a flicking touch in a left direction, the third sublayer 630 to the right can be displayed on the touchscreen [FIG. 6C]. In doing so, the first layer can continuously move in accordance with an input for moving (i.e., scrolling) the first layer in parallel, and more particularly, (e.g., in accordance with a duration or input distance of the drag or flicking). Alternatively, the first layer can be moved by unit of sublayer to enable a next adjacent sublayer to be displayed via a single touch input. When the first layer moves continuously, a right portion of the first sublayer 610 at the center and a left portion of the third sublayer 630 to the right can be simultaneously displayed on the display unit.

In case that a size of a layer is greater than that of the whole screen of the display unit, it is not divided into sublayers but can exist as a single layer.

The arranged configurations of the sublayers are just exemplary, by which the present invention is non-limited. And, the present invention is applicable to various sublayer arrangement configurations. For instance, sublayers are connected in portrait direction. For another instance, sublayers can be connected to one another in portrait and landscape directions to form a lattice pattern. For another instance, sublayers of the same layer can be arranged in a manner of being spaced apart from each other instead of contacting with each other.

The above-described sublayer can become one of a region for including icons as many as a preset number, a region set by a user on an application execution screen, a region set by an application itself on an application execution screen, a region corresponding to one page of a document and the like. And, the sublayer can be set to have a size displayable as one screen via the display unit.

At least one icon can be arranged on each of the above-described layers or sublayers. In this case, the icon may include one file itself. The icon is able to perform a shortcut function for execution of a specific file, application or menu. In a 3D user interface including a plurality of layers, as a user frequently changes a position of the icon or copies the icon, the demand for a facilitated method for the same is rising.

In a method proposed by the present embodiment, in order to change a position of an object situated on a certain layer or sublayer or copy the object, a 3D depth of the corresponding object may be changed, i.e., the corresponding object may be shifted to another layer having a different 3D depth. If this method is applied, a user is able to change a region of a first layer displayed on a display unit while a desired object has been shifted to a second layer from the first layer in which objects were previously arranged. Afterwards, the desired object can be made to return to the first layer. Thus, using the second layer, the desired object can be conveniently shifted to a desired region of the first layer. This is described with reference to FIG. 7 as follows. In the following description, assume that the object is an icon.

Figure 7:
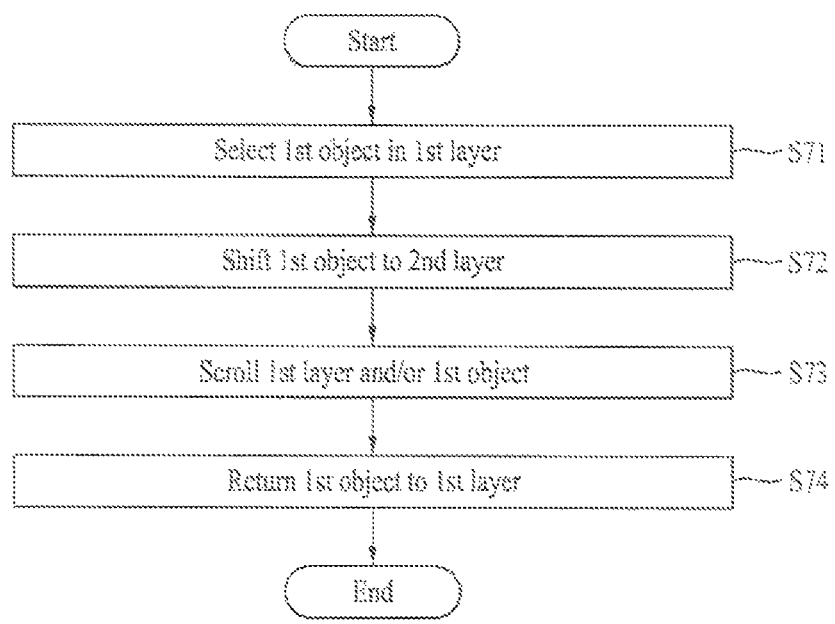
FIG. 7 is a flowchart for one example of a method of changing a position of an icon according to one embodiment of the present invention.

FIG. 7 is a flowchart for one example of a method of changing a position of an icon according to one embodiment of the present invention.

In the present embodiment including FIG. 7, assume that a stereoscopic or monoscopic 3D image can be provided to a user via a display unit. Assume that a plurality of layers including the layer having a reference 3D depth corresponding to a reference of a 3D depth can exist on the display unit. Assume that at least one icon can exist in the layer having the reference 3D depth. And, assume that the layer (e.g., the second layer shown in FIG. 6B) except the layer having the reference 3D depth (e.g., the first layer shown in FIG. 6B) is transparent or semitransparent not to completely hide the layer having the reference 3D depth.

Referring to FIG. 7, at least one icon can be selected from a layer having a reference 3D depth (hereinafter named a first layer for clarity) among a plurality of layers as a prescribed command input via the user input unit 130. In this case, if the display unit 151 includes a touchscreen, the prescribed command for selecting the icon can be input in a manner of inputting such a touch of a specific type as a long touch, a multi-touch, a double touch and the like [S71].

If a user selects the icon, a 3D depth of the selected icon can be changed into a 3D depth different from the reference 3D depth of the first layer [S72].

In this case, if the 3D depth of the selected icon is changed, it can mean that the selected icon is shifted to a second layer having the 3D depth different from that of the first layer. In particular, the selected icon can be shifted to the second layer in a direction vertical to the plane of the touchscreen. So to speak, if the icon is shifted to the second layer, it can mean that the corresponding 3D depth of the second layer is given to the shifted icon. A position, at which the shifted icon is arranged in the second layer, preferably may correspond to a point corresponding to the former point at which the icon was arranged in the first layer before the shift (i.e., the same position in user's viewpoint via the display unit but the 3D depth is changed). Alternatively, the selected icon can be arranged at the position previously set in the second layer.

In this case, since the 3D depth (i.e., the 3D depth of the second layer, hereinafter named a second depth) given to the selected icon is smaller than the 3D depth (hereinafter named a first depth) of the first layer, if the selected icon is shifted to the second layer from the first layer, the selected icon can be preferably seen closer to a user. Moreover, a prescribed visual effect such as a semitransparent effect, an icon vibration (e.g., shaking), a color change, a size change and the like can be additionally given to the selected icon having shifted to the second layer.

Besides, the selected corresponding icon is separated from the first layer and is then able to be shifted to the second layer, in accordance with a touch type for the icon selection. Alternatively, while the selected icon remains in the first layer, the same icon can be generated from the second layer in addition in accordance with a touch type for the icon selection. In the former case, the icon can be regarded as being shifted. In the latter case, the icon can be regarded as being copied.

If the 3D depth given to the icon selected by the user is changed, the user is able to shift or move the select icon and/or the first layer [S73].

The user is able to shift the icon from the first layer to the second layer in various ways. For instance, if a touch input for selection an icon is maintained, a position of the icon can be changed from the first layer to the second layer. It is able to shift the icon from the first layer to the second layer by performing a proximity touch after the touch input for selecting the icon is released. Alternatively, it is able to shift the icon from the first layer to the second layer by performing a proximity touch after the corresponding icon has been selected by a proximity long-touch, a proximity touch is performed. In doing so, the user is able to change (i.e., scroll) a region of the first layer displayed on the display unit not via the proximity touch but via a contact touch (e.g., a drag, a flicking, etc.).

If a contact touch input is not applied to the icon having shifted to the second layer, the region of the first layer displayed on the display unit can be changed by a contact touch input performed on the touchscreen.

After completion of the manipulation (i.e., the position change or the display region change) on the selected icon or the first layer, the user is able to make the selected icon to return to the previous first layer [S74]. In particular, the selected icon can return to the first layer in a direction vertical to the plane of the touchscreen. For this, the user performs a prescribed menu manipulation via the user input unit 130 or is able to input a corresponding touch to the touchscreen. Alternatively, for this, the sensing module 140 can be configured to recognize a specific action. For instance, if the sensing module 140 is adopted, the user is able to situate the selected icon to the reference 3D depth by shaking or inclining the mobile terminal.

In the following description, a detailed example of the icon shifting method is explained with reference to FIG. 8.

Figure 8:
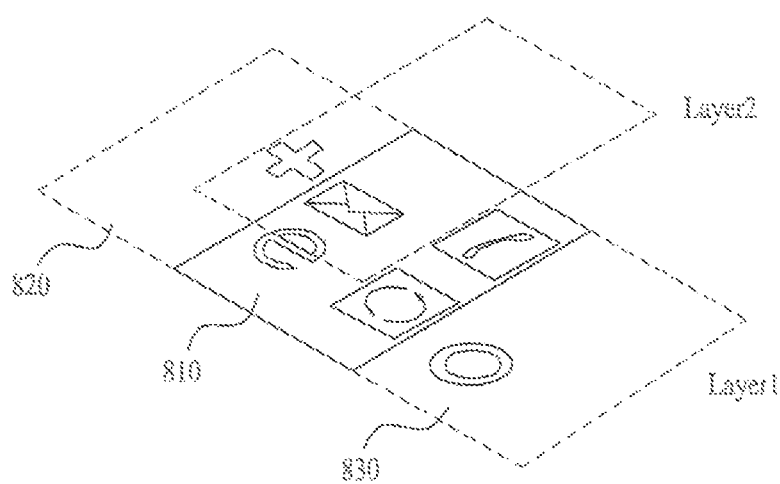
FIG. 8 is a diagram for one example of configuring a layer and an icon according to one embodiment of the present invention.

FIG. 8 is a diagram for one example of configuring a layer and an icon according to one embodiment of the present invention.

In particular, the following drawings including FIG. 8 conceptually show a 3D user interface including a plurality of layers. And, the 3D user interface is able to provide a stereoscopic or monoscopic 3D image to a user via the display unit.

Referring to FIG. 8, a first layer Layer1 having a reference 3D depth (i.e., a first depth) can include three sections, i.e., a first sublayer 810, a second sublayer 820 and a third sublayer 830. In this case, the three sublayers can be arranged in a manner of being connected to one another in width direction. And, total six icons can be arranged in the three sublayers in a prescribed formation for example.

A second layer Layer2 having a 3D depth (i.e., a second depth) smaller than that of the first layer can exist. Assume that the second layer itself is transparent. That is, the second layer is provided to indicate that the second depth virtually exists and thus the second layer may be unseen by a user.

Moreover, assume that an area corresponding to a size of one sublayer of the first layer and a size of the second layer is displayed via the display unit. In particular, when a user looks at the display unit, assume a status of arrangement for enabling the user to see the first sublayer 810 at the center of the first layer through the transparent second layer.

In this case, the first layer is a main menu screen or can be an execution region of an application that provides an image in which a file and the like are arranged as icons like a file browser. As mentioned in the foregoing description, the execution region is a region set on the execution screen of the application by a user or can be a region self-set by the application.

In the following description, methods for shifting an icon in the 3D user interface configuration shown in FIG. 8 or the like are explained in detail. In the following drawings including FIG. 9, a part of a first layer except a region currently displayed on the display unit can be omitted in part for clarity of illustration.

In the following embodiments including the embodiment shown in FIG. 9, assume that the display unit includes a touchscreen.

FIGS. 9A to 9E are diagrams for one example of a method of shifting an icon by changing a display region on a first layer with a reference 3D depth in a mobile terminal according to one embodiment of the present invention.

Figure 9A:
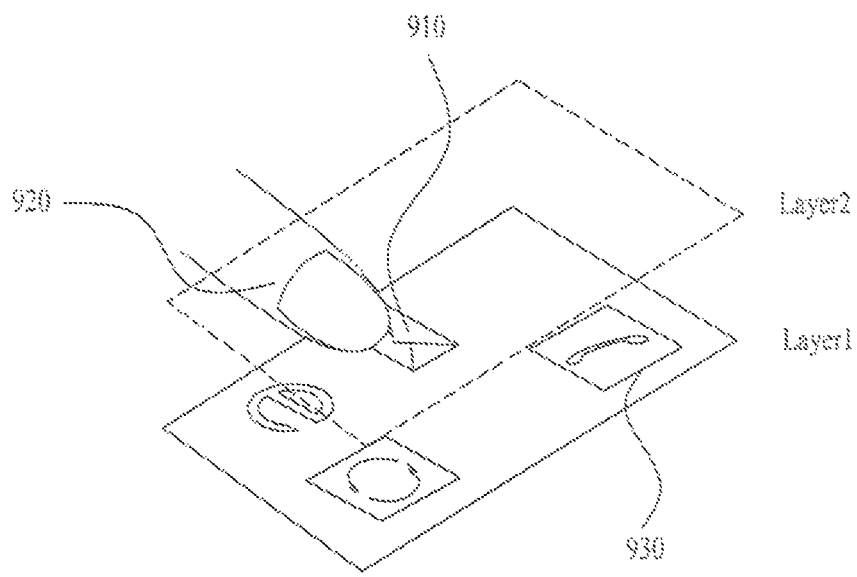
FIGS. 9A to 9E are diagrams for one example of a method of shifting an icon via a layer display region change to a reference 3D depth in a mobile terminal according to one embodiment of the present invention.

Referring to FIG. 9A, in order to shift a message icon 910 on a first layer to a position below a phone icon 930, a user is able to apply a touch input for selecting the message icon 910 using a pointer 920. For instance, the touch input can be performed by long-touching a point on the touch screen, at which the message icon 910 in the first layer is situated.

Figure 9B:
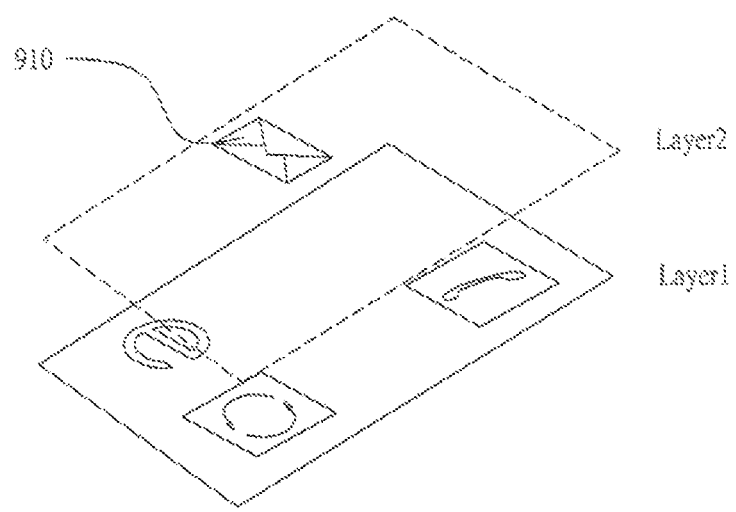

If the touch input is applied, the message icon 910 can be shifted to a second layer [FIG. 9B]. In particular, a 3D depth of the message icon 910 can be changed into a second depth of the second layer.

Figure 9C:
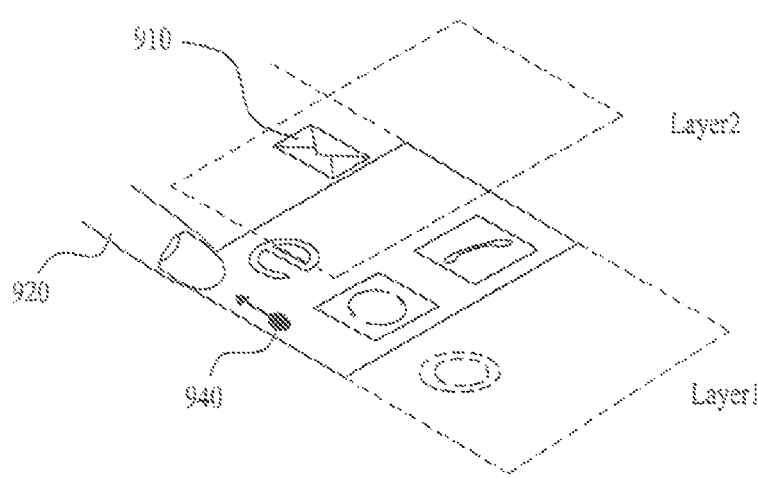
Figure 9D:
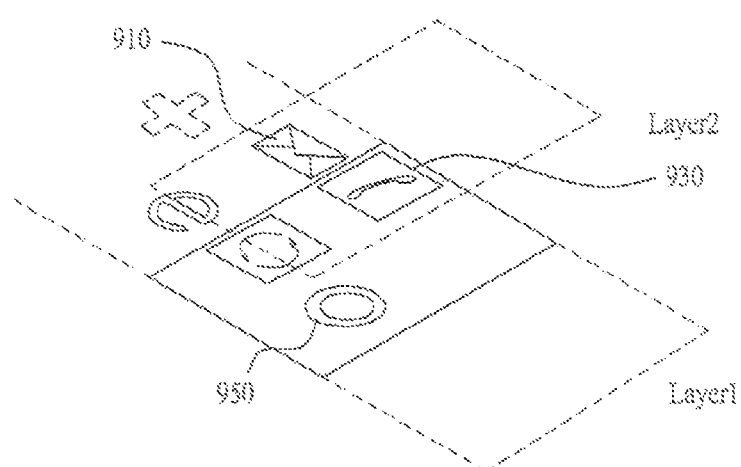

Subsequently, referring to FIG. 9C, if the user applies an input of a drag or flicking touch 940 to an empty space on the touchscreen using the pointer 920, the first layer can be shifted to the left. Accordingly, on the display unit, referring to FIG. 9D, icons except the message icon 910 are shifted to the left in the first layer and a circle icon 950 used to be situated at a right sublayer of the first layer can be displayed. When the first layer is shifted, the second layer can be maintained without being shifted.

If the user performs a proximity touch & drag on the message icon 910, the message icon can be shifted on the second layer while the first layer is not shifted.

If the first layer is shifted in a desired distance, the user is able to apply a command input for shifting the message icon 910 to the first layer again. In this case, the command input can include a long proximity touch applied to the message icon 910 or a mobile terminal shaking. As mentioned in the foregoing description, the mobile terminal shaking can be detected by the sensing unit 140.

Figure 9E:
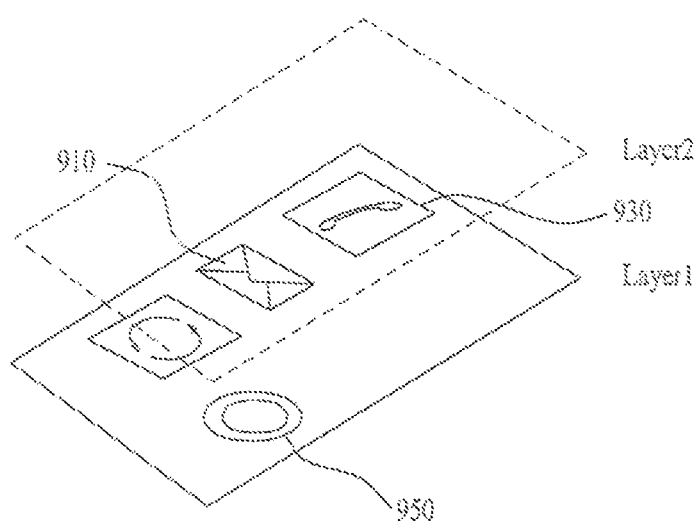

Therefore, referring to FIG. 9E, the message icon 910 can be shifted to the first layer again. In particular, if a command for shifting the message icon 910 from the second layer to the first layer is inputted, the message icon can be shifted to a point on the first layer corresponding to the former point on the second layer at which the message icon 910 was situated. In particular, the user sees the message icon 910 as if the message icon 910 goes down deeper in a direction vertical to the plane of the touchscreen. When the message icon 910 is going down, if a different icon exists at the position on the first layer, the message icon 910 occupies the position of the different icon and the different icon is automatically shifted to another position on the first layer. Alternatively, the different icon is not shifted to a different position but the message icon 910 can be set to be automatically situated at the different position on the first layer.

According to the above method described with reference to FIG. 9, after a user has shifted an icon, of which position arranged on a first layer is attempted to be changed, to a second layer, the user freely changes a region of the first layer displayed on a display unit and is then able to shift the icon to the first layer again from the attempted position. Therefore, it is convenient for the user to shift the icon.

Although the 3D depth of the selected icon is described as decreasing in FIG. 9, a 3D depth of an icon except the selected icon can increase. This is explained with reference to FIG. 10 as follows.

FIGS. 10A to 10E are diagrams for one example of a method of shifting an icon via an icon position change to a reference 3D depth in a mobile terminal according to one embodiment of the present invention. In the following description with reference to FIGS. 10A to 10E, assume that a layer having a reference 3D depth is a second layer. And, assume that the reference 3D depth is a second depth.

Figure 10A:
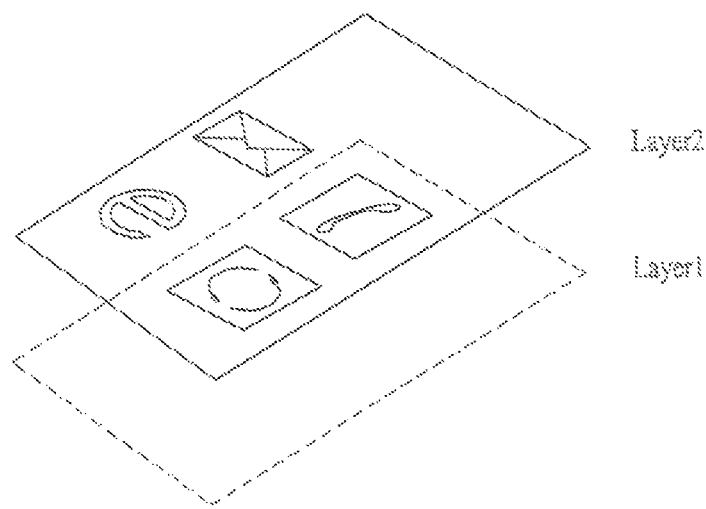
FIGS. 10A to 10E are diagrams for one example of a method of shifting an icon via an icon position change to a reference 3D depth in a mobile terminal according to one embodiment of the present invention.

Referring to FIG. 10A, four kinds of icons are arranged in a prescribed formation on a second layer having a reference 3D depth. And, there can exist a first layer to which a 3D depth (i.e., a first depth) greater than that of the second layer is given. Moreover, the second layer is transparent or semitransparent to enable an icon shifted to the first layer to be seen.

Figure 10B:
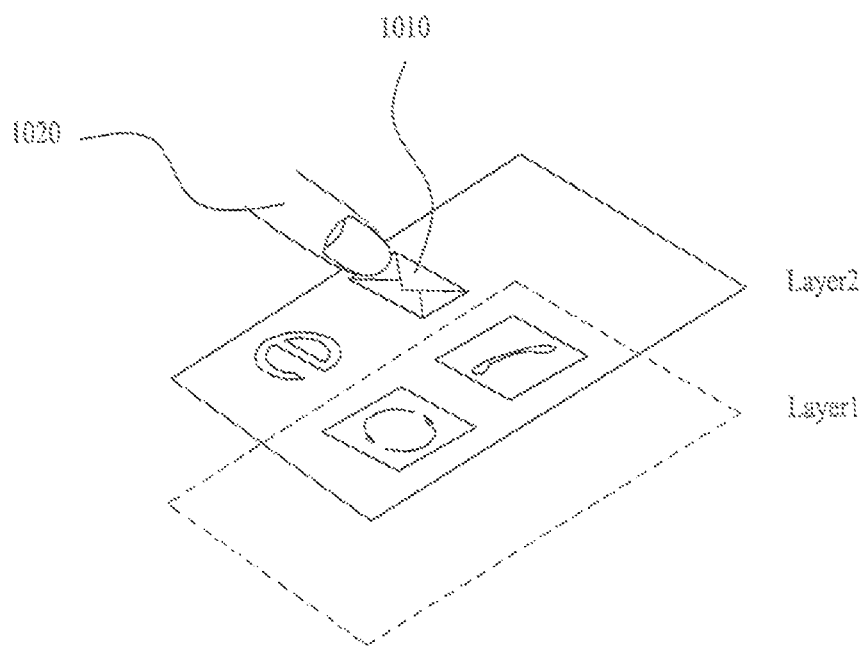

Referring to FIG. 10B, in order to shift a message icon 1010, a user is able to apply a long touch input to the message icon 1010 using a pointer 1020.

Figure 10C:
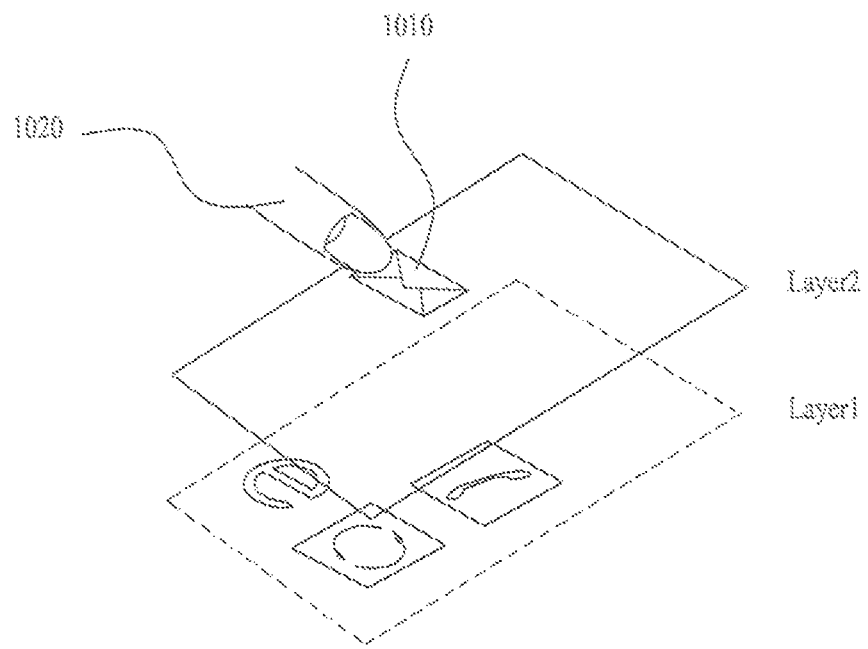

Referring to FIG. 10C, the rest of the icons except the message icon 1010 can be shifted to the first layer. In doing so, the user may feel like the rest of the icons except the message icon 1010 as if they are getting away from the user.

Figure 10D:
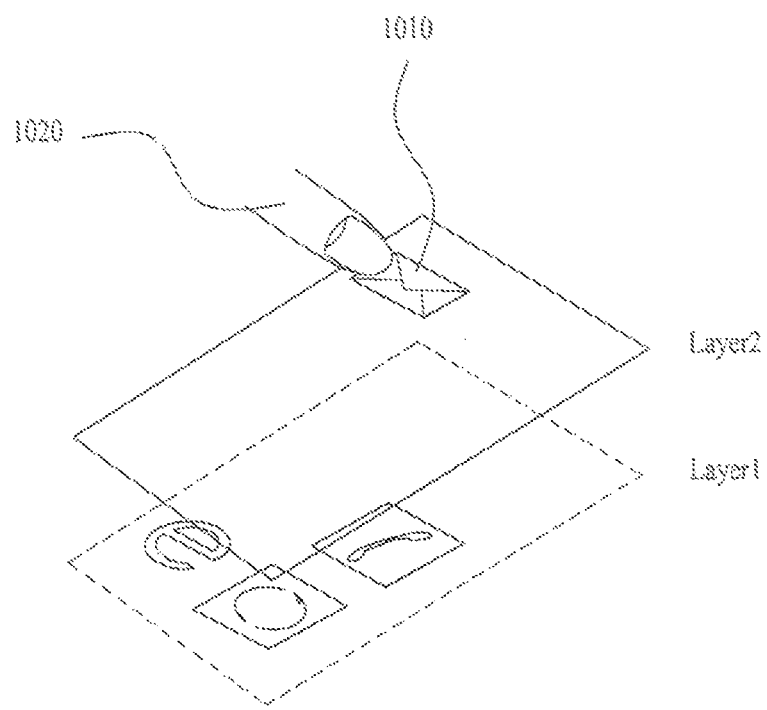
Figure 10E:
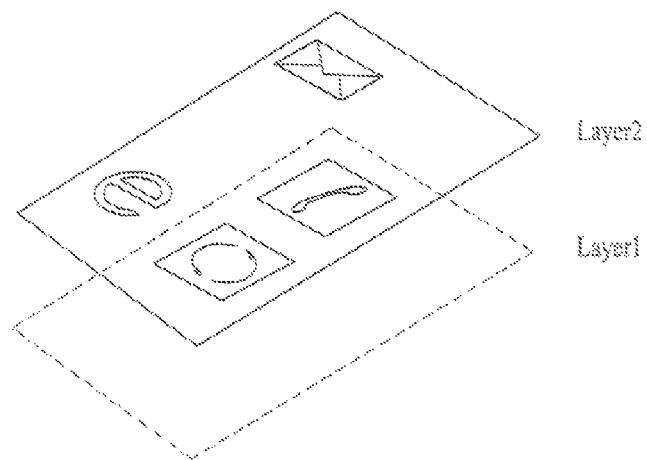

Afterwards, referring to FIG. 10D, the user is able to shift the message icon 1010 to a desired position using the pointer 1020. The user may then input a command (e.g., a mobile terminal shaking, etc.) for putting back the icons except the message icon 1010 to the previous positions, thereby completing the icon position change [FIG. 10E].

After the rest of the icons except the selected icon have been shifted to the first layer, a contact touch input applied to the touchscreen may not execute anything about the selected icon but may execute changing a display region of the first layer. In this case, the position of the selected icon arranged on the second layer can be changed by a proximity touch input. This is described with reference to FIGS. 10F to 10I as follows.

FIGS. 10F to 10I are diagrams for one example of a method of shifting an icon via a layer position change in a mobile terminal according to one embodiment of the present invention.

Figure 10F:
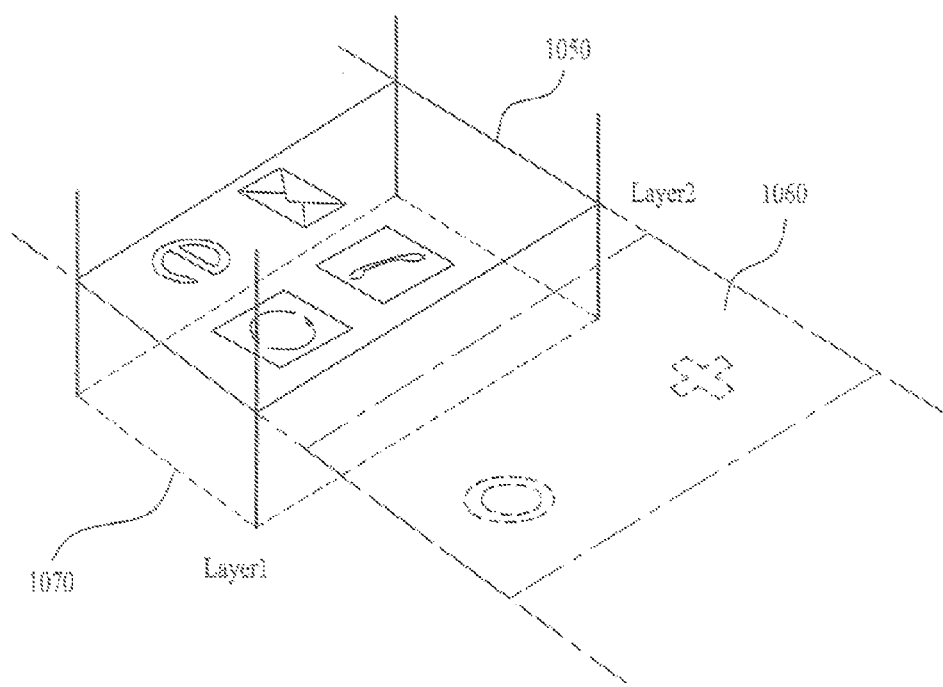
FIGS. 10F to 10I are diagrams for one example of a method of shifting an icon via a layer position change in a mobile terminal according to one embodiment of the present invention.

Referring to FIG. 10F, a basic layer structure is similar to the former layer structure shown in FIG. 10A. Yet, assume that a sublayer A 1050 and a sublayer B exist in a second layer. And, assume that a sublayer C 1070 exists in a first layer. Moreover, assume that each of the sublayers A, B and C is shiftable between the first layer and the second layer.

Assume that four icons are arranged in the sublayer A 1050. Assume that two icons are arranged in the sublayer B 1060. Assume that the sublayer B 1060 is arranged on the right side of the sublayer A 1050 by being spaced apart from the sublayer A 1050. Assume that the first layer and a region corresponding to a virtual space over the first layer are displayed via the display unit. Assume that the first layer itself has nothing to do with transparency. And, assume that the second layer itself is transparent or semitransparent. Hence, in the situation shown in FIG. 10F, a user is able to see the sublayer A 1050 via the display unit.

Figure 10G:
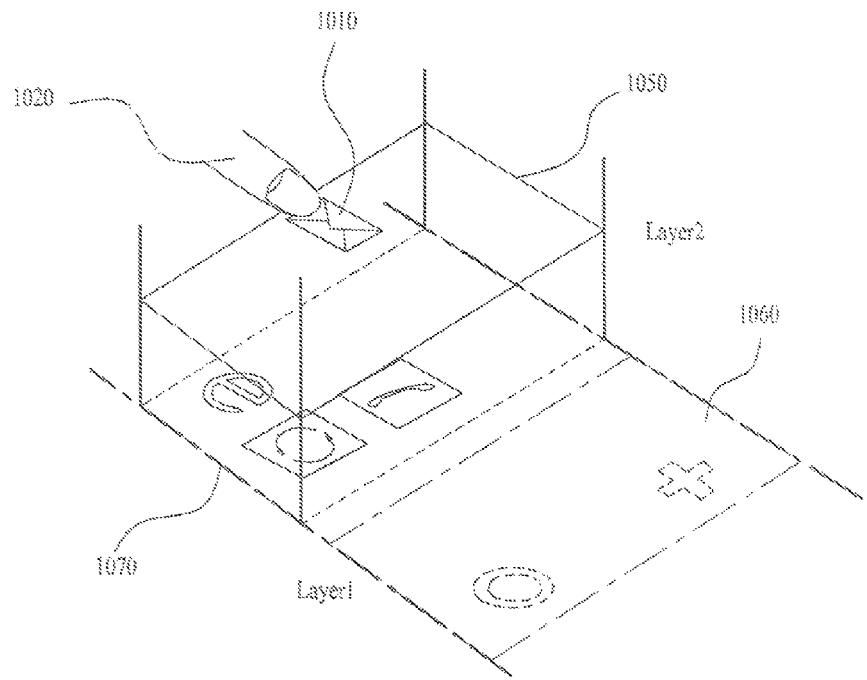

In the above-described layer structure shown in FIG. 10F, if a message icon 1010 is selected, referring to FIG. 10G, all icons except the message icon 1010 are shifted to the first layer from the first layer. In doing so, in user's viewpoint, three of the icons arranged in the sublayer A 1050 except the message icon 1010 seem to recede. Yet, icons of the sublayer B 1060 can be shifted to the first layer as well. If all the icons of the sublayer B 1060 are shifted to the first layer in the virtual space, it can be understood as the sublayer B itself is shifted to the first layer.

As mentioned in the above-mentioned assumption, after the icons except the message icon 1010 have been shifted to the first layer, a touch input applied to the touchscreen is not applicable to the message icon 1010 but can be applied for a region shift of the first layer displayed on the display unit.

Figure 10H:
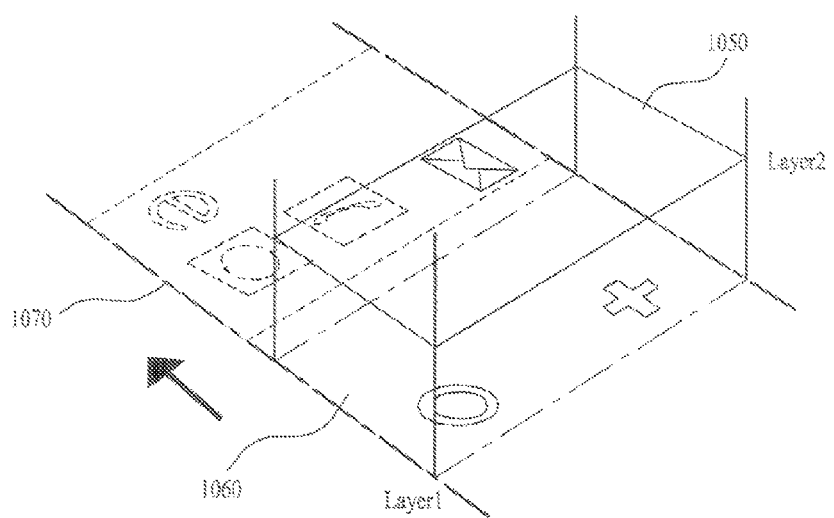

Therefore, if a user applied a drag or flicking touch input in a left direction via the touchscreen, referring to FIG. 10H, the icons situated in the first layer are shifted to the left together. Therefore, the two icons arranged on the sublayer B 1060 can be seen to have a 3D depth greater than that of the message icon 1010. In FIG. 10G, the three icons used to be seen under the message icon are shifted to the left and then may not be seen. Moreover, if the three icons are not seen, it can be understood as the sublayer C 1070 including the three icons is shifted to the left.

Figure 10I:
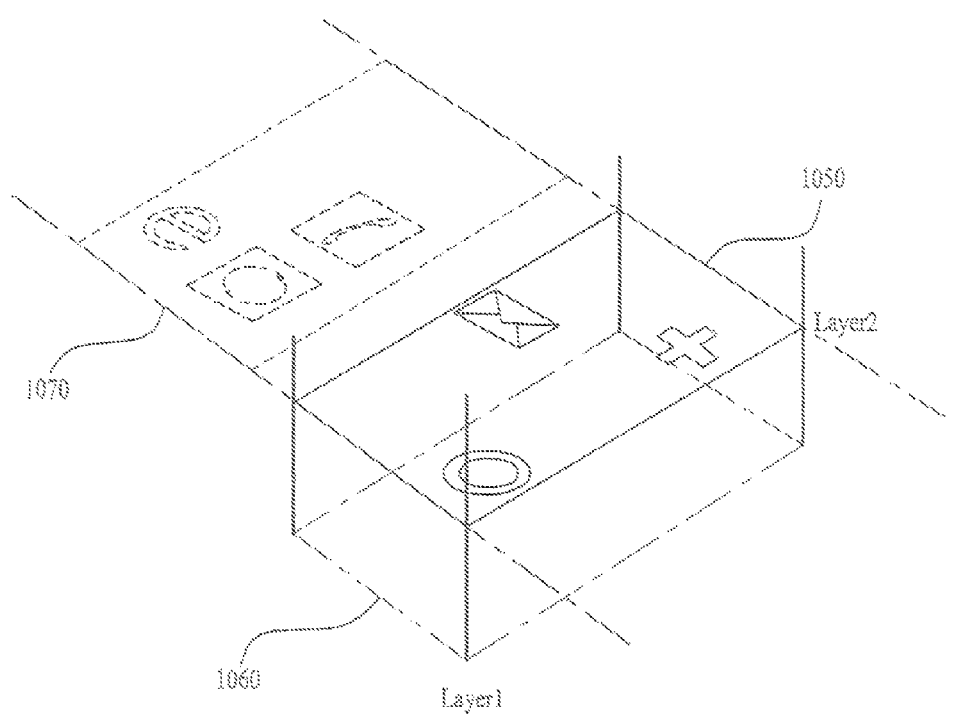

Afterwards, the user inputs a command (e.g., a mobile terminal shaking) for enabling the icons except the message icon 1010 to go back to their original positions to complete the icon position change [FIG. 10I]. In particular, the two icons arranged on the sublayer B 1060 can be shifted to the sublayer A 1050 of the second layer. And, the three icons situated on the sublayer C 1070 can be shifted to the first layer. Yet, since the three icons of the sublayer C 1070 are situated on the left side of the sublayer A 1050, they may not seen by the user continuously.

If all the three icons situated on the sublayer C 1070 are shifted to the first layer, it can be understood as the sublayer C 1070 itself is shifted to the first layer.

In the above description, one icon (e.g., message icon) is selected from a layer having a reference 3D depth, by which the present embodiment is non-limited. For instance, a plurality of icons can be simultaneously selected from a layer having a reference 3D depth.

In the following description, a method of selecting a plurality of icons is explained with reference to FIG. 11 and FIG. 12.

Figure 11A:
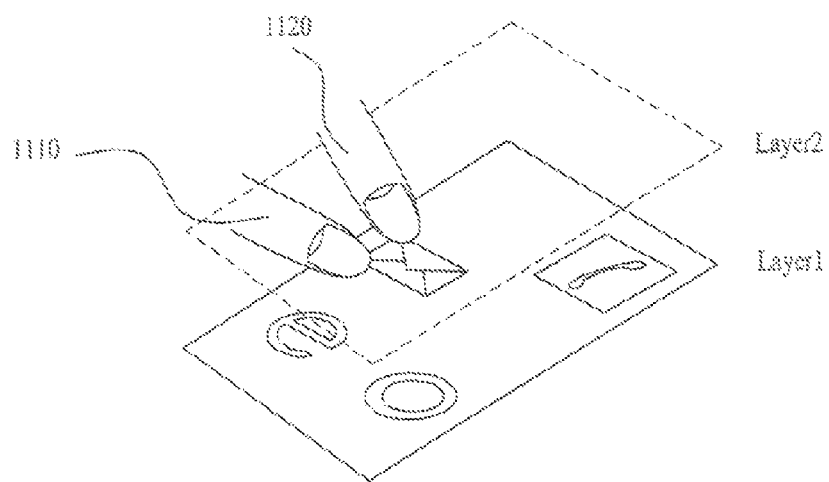
FIGS. 11A to 11C are diagrams for examples of selecting a plurality of icons by a multi-touch according to another aspect of one embodiment of the present invention, respectively.
Figure 11B:
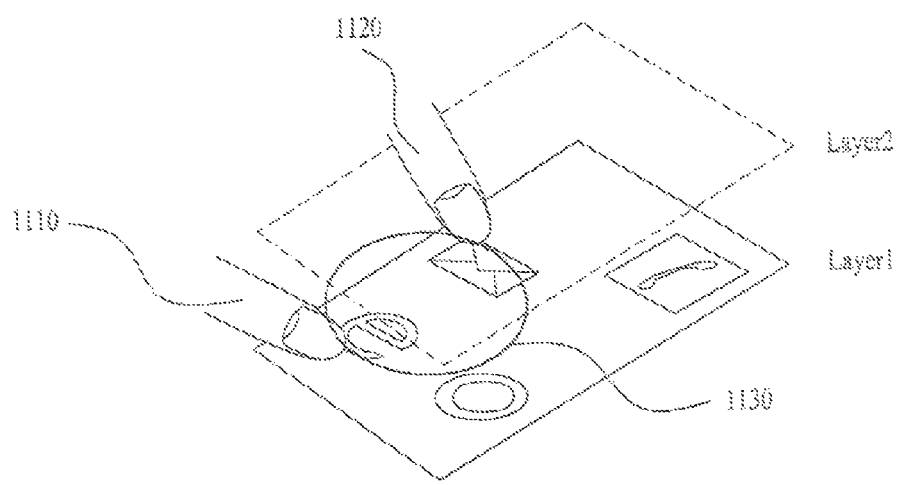
Figure 11C:
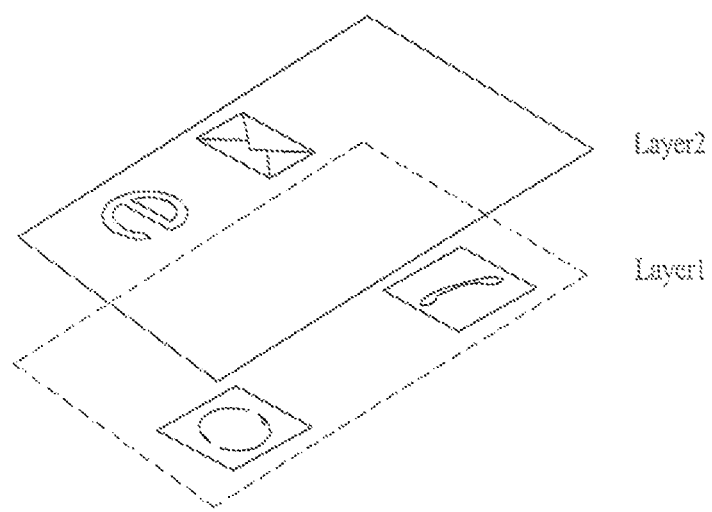

FIGS. 11A to 11C are diagrams for examples of selecting a plurality of icons by a multi-touch according to another aspect of one embodiment of the present invention, respectively. In FIG. 11, the 3D user interface structure shown in FIG. 8 is assumed.

Referring to FIG. 11A, a user multi-touches two pointers 1110 and 1120 on the display unit to generate two contact points on the display unit. In doing so, an icon corresponding to the two contact points or an icon situated between the two contact points can be selected. In case that the user attempts to select a plurality of icons, the user is able to apply a multi-touch to each of the icons in order. If the multi-touch is applied to each of at least two icons, it is able to simultaneously select the at least two icons. A multi-touch input for selecting an icon from a first layer can be discriminated from a touch input for shifting an icon, which has been shifted to a second layer, on the second layer.

Referring to FIG. 11B, a plurality of icons can be simultaneously selected through a multi-touch at a time. In particular, icons situated within a circular space 1130 having a diameter set to a distance between two pointers 1110 and 1120 can be selected at a time.

As mentioned in the foregoing description with reference to FIG. 11A or FIG. 11, the result from selecting at least two icons simultaneously is shown in FIG. 11C.

Figure 12A:
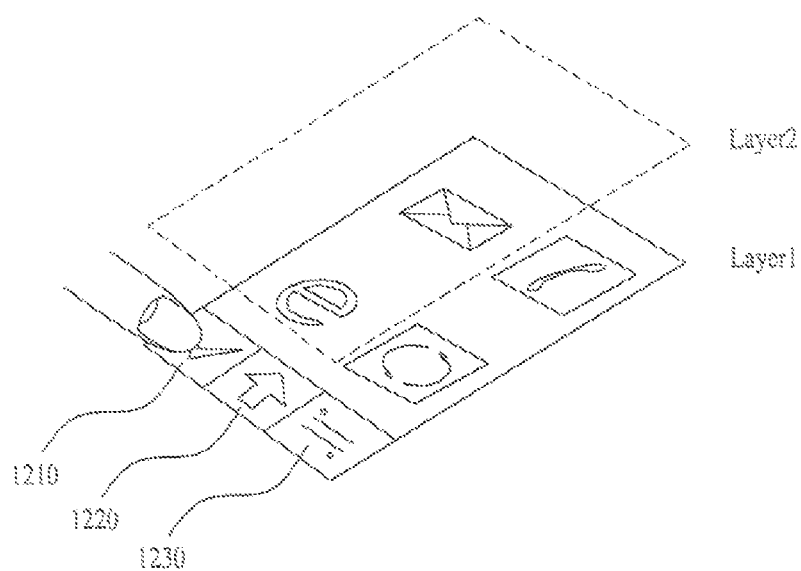
FIGS. 12A to 12C are diagrams for examples of selecting a plurality of icons by a menu manipulation according to another aspect of one embodiment of the present invention, respectively.
Figure 12B:
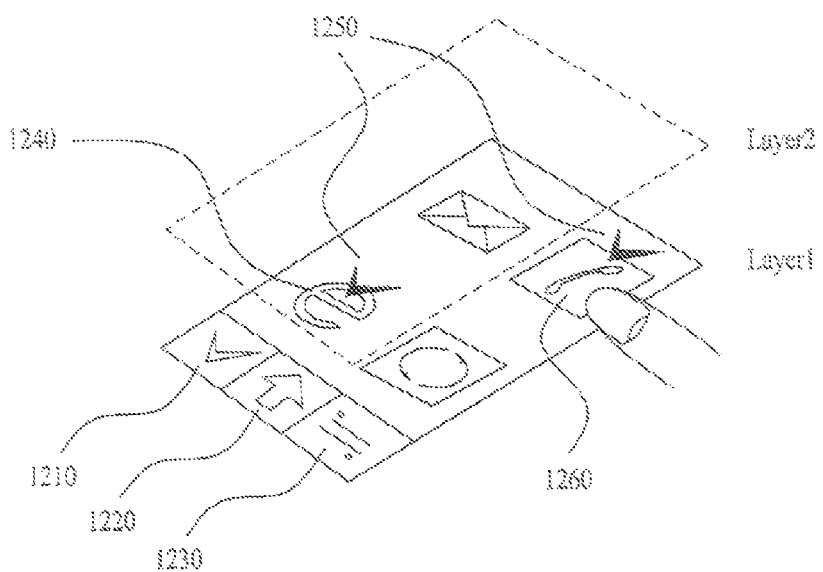
Figure 12C:
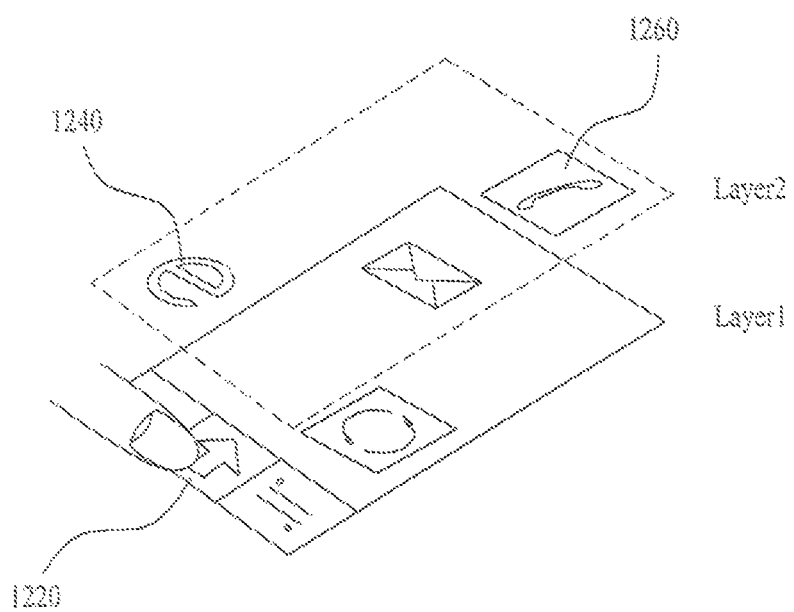

FIGS. 12A to 12C are diagrams for examples of selecting a plurality of icons by a menu manipulation according to another aspect of one embodiment of the present invention, respectively. In FIG. 12, assume that a basic 3D user interface structure is similar to the former 3D user interface structure shown in FIG. 8.

Referring to FIG. 12A, a menu region is provided to one side of a first layer including a plurality of icons with a reference 3D depth. And, a check menu 1210, a 3D depth change menu 1220 and a similar icon select menu 1230 are included in the menu region.

A user is able to select the check menu 1210 to select a plurality of icons on the first layer. After the check menu 1210 has been selected, referring to FIG. 12B, a visual effect of a check type 1250 can be given to each of the icons 1240 and 1260 to which a touch input is applied by the user.

If all desired icons are selected to change 3D depths thereof, referring to FIG. 12C, the user manipulated the 3D depth change menu 1220 to shift all the checked icons to the second layer.

After the similar icon select menu 1230 has been manipulated, if a user selects a prescribed icon, other icons having the property identical to that of the user-selected icon can be selected together. In this case, the identical property can mean that the property of an indication target of the icon is identical. For instance, after the similar icon select menu 1230 has been manipulated, if an icon corresponding to a document file is selected, all icons corresponding to the document file in the corresponding layer can be selected at a time.

It is described above that the 3D depth has been changed in accordance with the selection of a plurality of icons by at least one of the above methods described with reference to FIG. 11 and FIG. 12. A method of changing a layer region displayed on the display unit or a method of changing a position of the selected icon can follow the foregoing descriptions of the methods according to one embodiment of the present invention.

In the following description, a method of inputting a command for enabling a 3D depth of a selected icon to go back to an original position without using the sensing module 140 is explained with reference to FIG. 13.

Figure 13A:
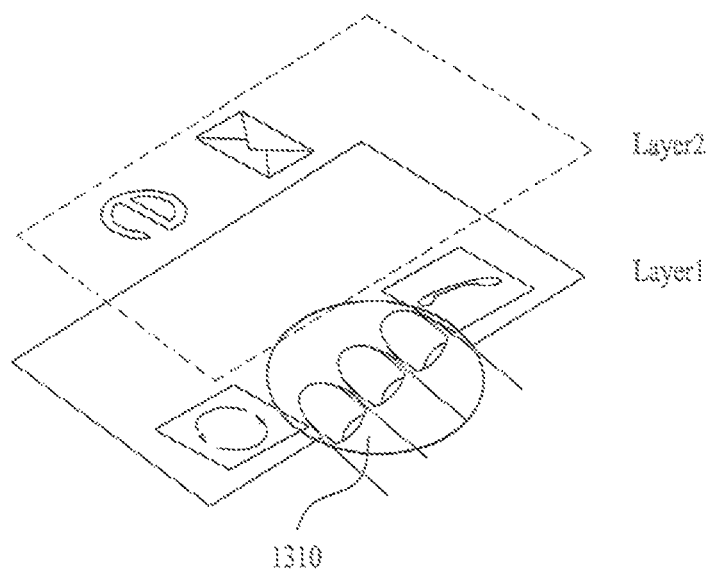
FIG. 13A and FIG. 13B are diagrams for a method of inputting a command for returning a 3D level of a 3D-level changed icon to a previous level before the change in a mobile terminal according to one embodiment of the present invention, respectively.
Figure 13B:
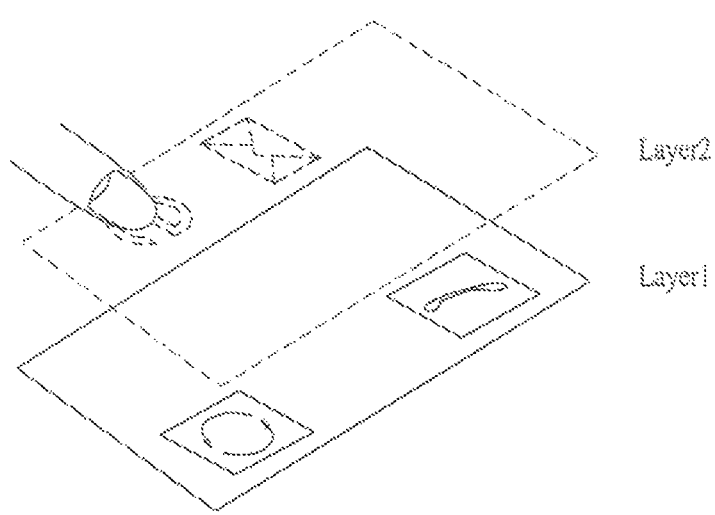

FIG. 13A and FIG. 13B are diagrams for a method of inputting a command for returning a 3D depth of a 3D-depth changed icon to a previous 3D depth before the change in a mobile terminal according to one embodiment of the present invention, respectively.

FIG. 13A assumes a following case. First of all, a user selects two icons on the right side by one of the foregoing methods and then shifts the selected two icons from a first layer to a second layer. In this case, if a touch area equal to or greater than a prescribed area is detected on a touchscreen, the selected icons can be shifted back to the first layer. For this, the user is able to bring three fingers 1310 into contact with the touchscreen simultaneously. If so, the selected icons can be shifted to the first layer at a time.

In doing so, if the touch input having the touch area equal to greater than the prescribed area is performed multiple times (e.g., a double tapping) within a prescribed period of time, the icons shifted to the second layer can be selectively shifted to the first layer. In particular, if the touch input having the touch area equal to greater than the prescribed area is detected on the touchscreen multiple times within the prescribed period of time, referring to FIG. 13B, a prescribed visual effect (e.g., semi-transparency) is given to the icons existing in the second layer. While the prescribed visual effect is valid, the icon receiving the touch input from the user can be selectively shifted to the first layer.

Meanwhile, in order to select a plurality of icons to shift to the first layer, the menu manipulating method shown in FIG. 12 is available. In particular, a user selects icons, which is to be shifted to the first layer, from the second layer by selecting the check menu (i.e., a check mark is given) and is then able to shift the checked icons to the first layer simultaneously by manipulating the 3D level change menu.

In the description of the above embodiment, the 3D user interface configured using two rectangular layers and four icons are assumed for example, by which the present invention is non-limited. In particular, the present invention is non-limited by the arranged structures, numbers and configurations of layers and icons. Moreover, an icon can be replaced by such a selectable and shiftable/copyable object as a thumbnail, a figure, a text, a menu button and the like.

At least one background image can be arranged in the first layer of the 3D user interface. The at least one background image of the first layer can be shifted in accordance with a touch gesture performed on the touchscreen. That the at least one background image is shifted can mean that the at least one background image can be displayed on the touchscreen in order.

The above embodiment is applicable to such a mobile terminal as a tablet PC. The tablet PC is described in detail with reference to FIG. 14 as follows.

Figure 14:
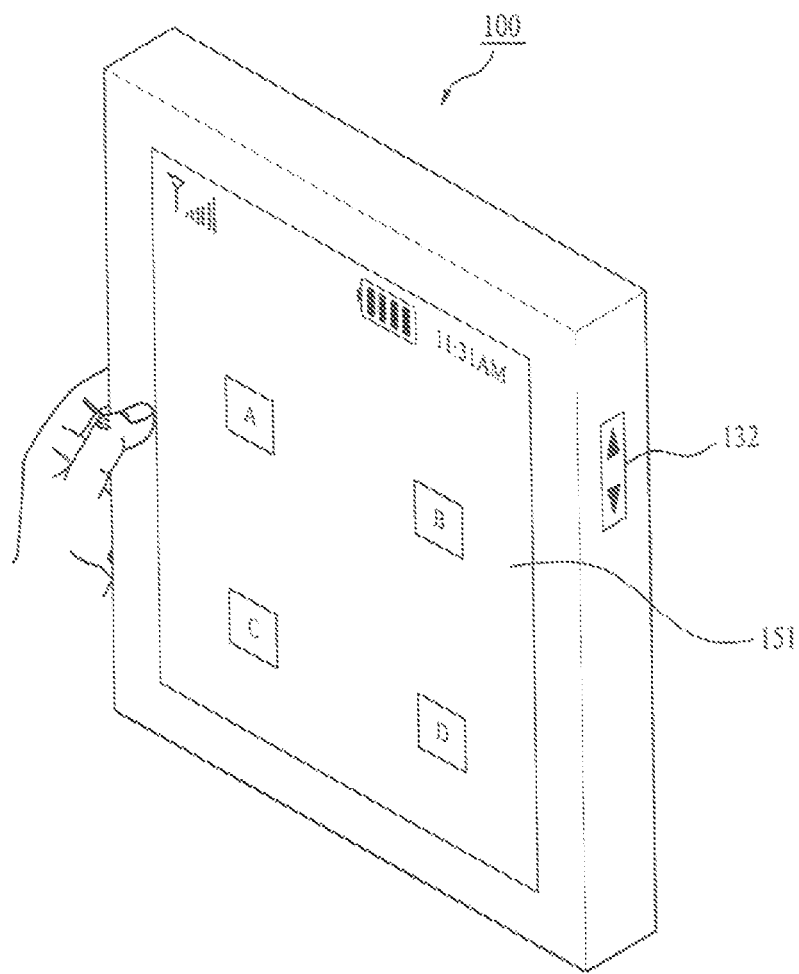
FIG. 14 is a front perspective diagram of a mobile terminal of a tablet PC type according to the present invention.

FIG. 14 is a front perspective diagram of a mobile terminal of a tablet PC type according to the present invention.

Referring to FIG. 14, a mobile terminal 100 of a tablet PC type includes a housing having a front side, a rear side and lateral sides. And, a touchscreen 151 can be loaded on the front side of the housing. Moreover, at least one touch-executable object can be displayed on the touchscreen 151.

As mentioned in the foregoing description, a user input unit 132 and an interface unit (not shown in the drawing) can be provided to the lateral side(s) of the housing.

The functional components of the tablet PC type mobile terminal can be identical to those of the former mobile terminal described in the foregoing description. Therefore, the descriptions of the functional components of the tablet PC type mobile terminal shall be omitted from the following description for clarity of this disclosure.

In the foregoing description, the 3D user interface is positioned in parallel with the plane of the touchscreen 400. That is, a plurality of layers differing from each other in 3D depth can be arranged in parallel with the plane of the touchscreen 400, by which the present embodiment is non-limited. For instance, the 3D user interface can be arranged in a manner of inclining at a prescribed angle against the plane of the touchscreen 400. This is explained as follows.

If the display module 151 includes a touchscreen, implementation of the following embodiment can be further facilitated. Therefore, the following description is made on the assumption that the display module 151 includes the touchscreen. And, a display screen of the touchscreen 151 shall be indicated by a reference number '400'.

Figure 15:
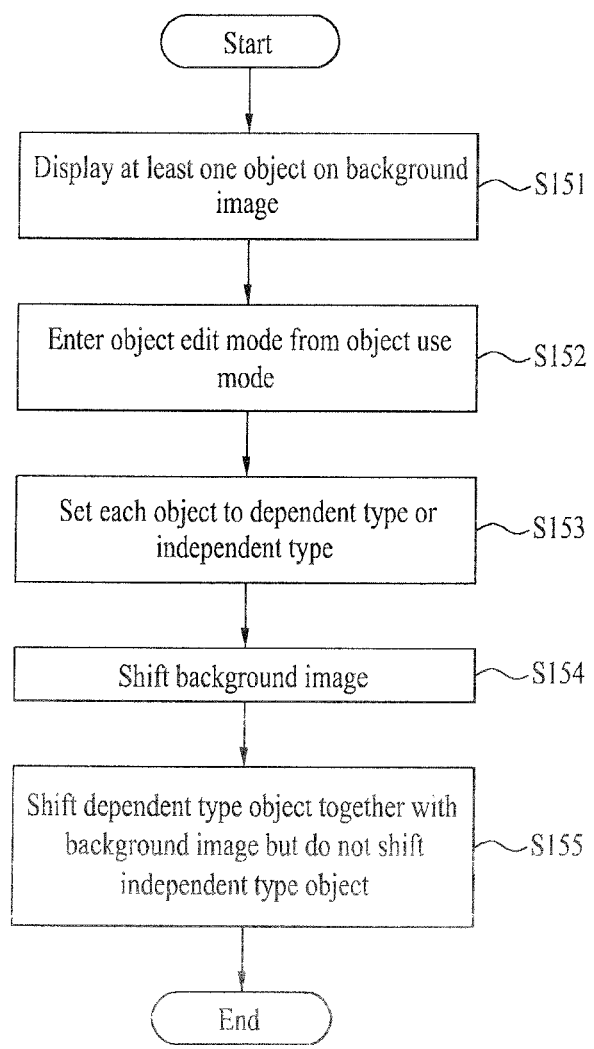
FIG. 15 is a flowchart for a method of controlling a mobile terminal according to an embodiment of the present invention.
Figure 16A:
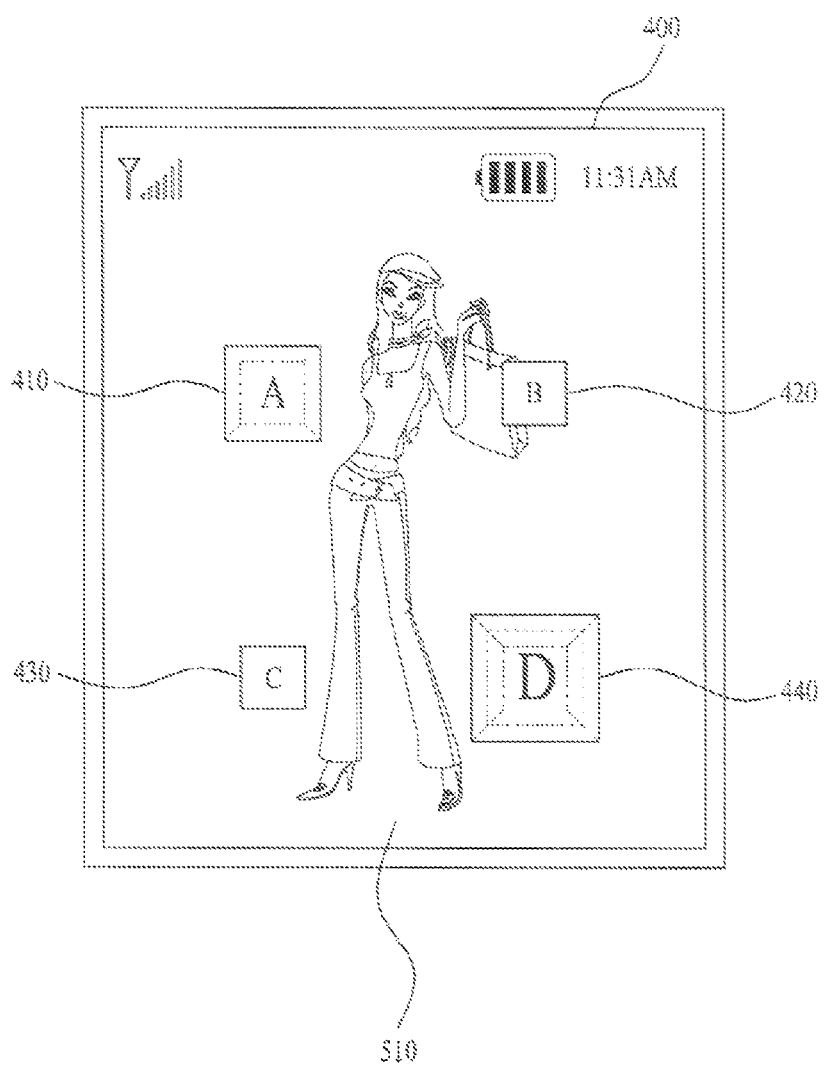
FIG. 16A and FIG. 16B are diagrams of display screen configurations for a method of controlling a mobile terminal according an embodiment of the present invention.
Figure 16B:
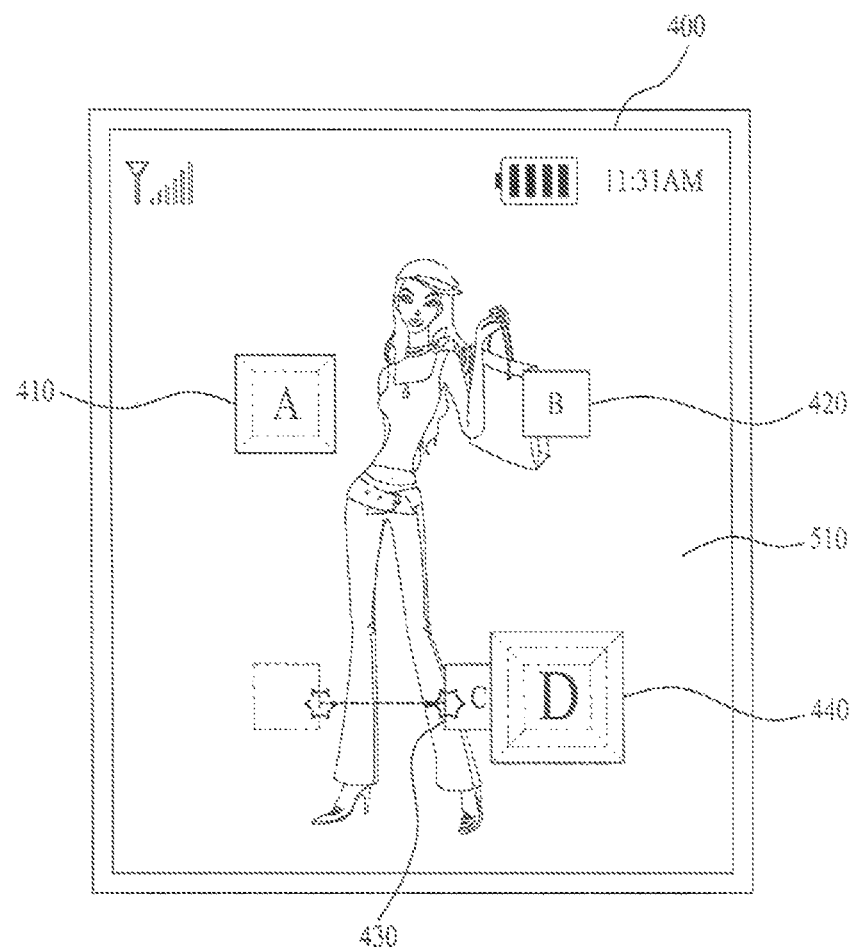

FIG. 15 is a flowchart for a method of controlling a mobile terminal according to an embodiment of the present invention. FIG. 16A and FIG. 16B are diagrams of display screen configurations for a method of controlling a mobile terminal according an embodiment of the present invention.

Referring to FIG. 16a, the mobile terminal 100 is in a standby mode. Therefore, the controller 180 is able to control a standby screen (or a home screen) to be displayed on the touchscreen 400.

On the standby screen, a background image 510 is displayed. And, at least one or more objects 410, 420, 430 and 440 can be displayed on the background image 510 [S151]. For the standby screen, the background image 510 can be replaced by a different background image. Therefore, the background image 510 displayed on the standby screen shall be named 'first background image' to be discriminated from other background images.

If one of the at least one or more objects is selected from the standby screen, a function according to the selected object can be executed in the mobile terminal 100 [not shown in the drawing]. In the following description, a mode of the mobile terminal 100 for executing an object for its use shall be named 'object use mode'. For instance, since the object is selectable and usable at any time in the standee by mode, the mobile terminal 100 in the standby mode can be understood as staying in the object use mode.

FIG. 16A exemplarily shows that when the mobile terminal 100 is in the object use mode, the first background image 510 in the 3D user interface implemented on the touchscreen 400 is displayed in parallel with the plane of the touchscreen 400. Assume that the 3D user interface includes first to third virtual layers having first to third depths, respectively. In this case, assume that the first depth and the third depth are the deepest and the shallowest in the 3D user interface. And, assume that the second depth lies between the first depth and the third depth. Assume that the virtual first to third layers are transparent and thus a user is unable to see the first to third layers.

The first background image 510 can be arranged on the first layer in the 3D user interface.

The at least one or more objects can be displayed 3-dimensionally on the first background image 510 to give perspective to them if necessary. In particular, in order for each of the at least one or more objects to be seen as spaced apart from the first background image 510 despite whether the corresponding object is a dependent type or an independent type, the corresponding object can be displayed on the second layer or the third layer. Besides, the dependent type and the independent type shall be described with reference to FIGS. 20A to 20f later. And, it is a matter of course that the objects can be displayed on the first layer as well.

FIG. 16A exemplarily illustrates the following arrangements. First of all, the B object 420 and the C object 430 are situated right onto the first background image 510 in the first layer to be arranged closest to the first background image 510. The A object 420 is situated in the second layer to be arranged next closest to the first background image 510. And, the D object 440 is situated in the third layer to be arranged farthest from the first background image 510.

A position of each object in a prescribed one of the layers can be determined by a user's presetting or a category (e.g., a game category, a video category, a widget category, etc.) of the corresponding object.

Referring to FIG. 16B, in case that two different object 430 and 440 are situated in different layers in the object use mode, respectively, one of the two objects can be displayed on the first background image 510 to block the other. When the C object 430 is touched & dragged to a position of the D object 440, FIG. 1B exemplarily shows that at least one portion of the C object 430 with the first depth is blocked by the D object 440 with the third depth.

The blocked C object 430 can be selected after the D object 440 has been put aside to another position by a touch & drag (not shown in the drawing).

As mentioned in the foregoing description, at least one of the displayed object on the standby screen can be removed or replaced by another reserved object if necessary. This is explained in detail with reference to FIGS. 17A to 17C as follows.

Figure 17A:
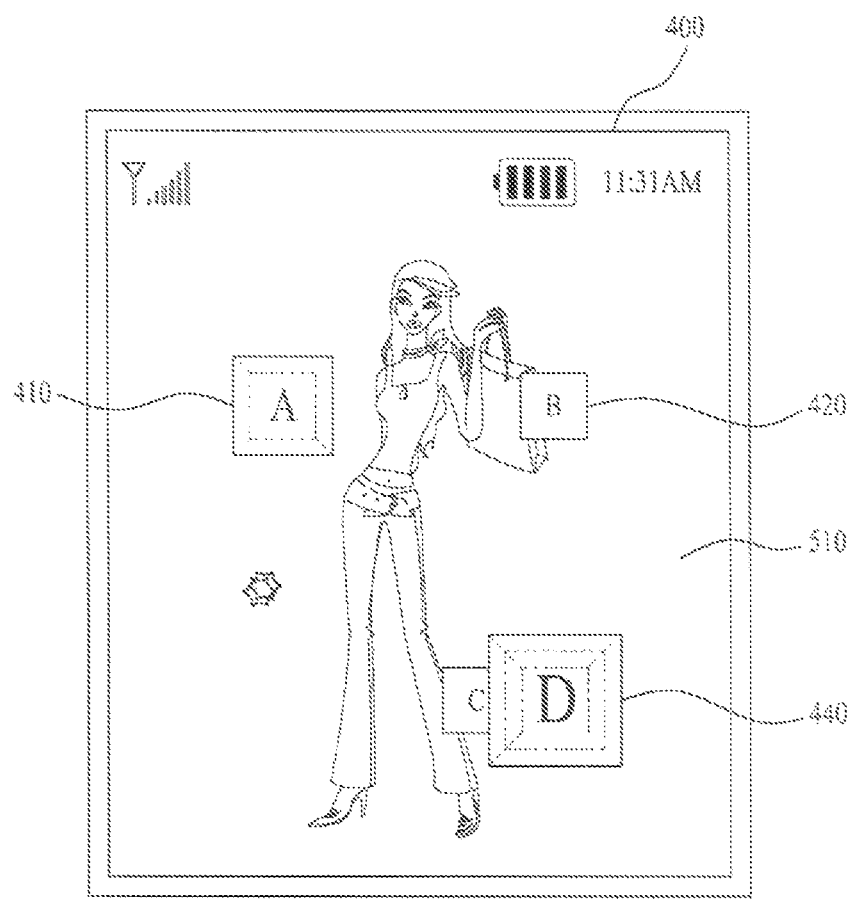
FIGS. 17A to 17C are diagrams of display screen configurations for a method of controlling a mobile terminal according an embodiment of the present invention.
Figure 17B:
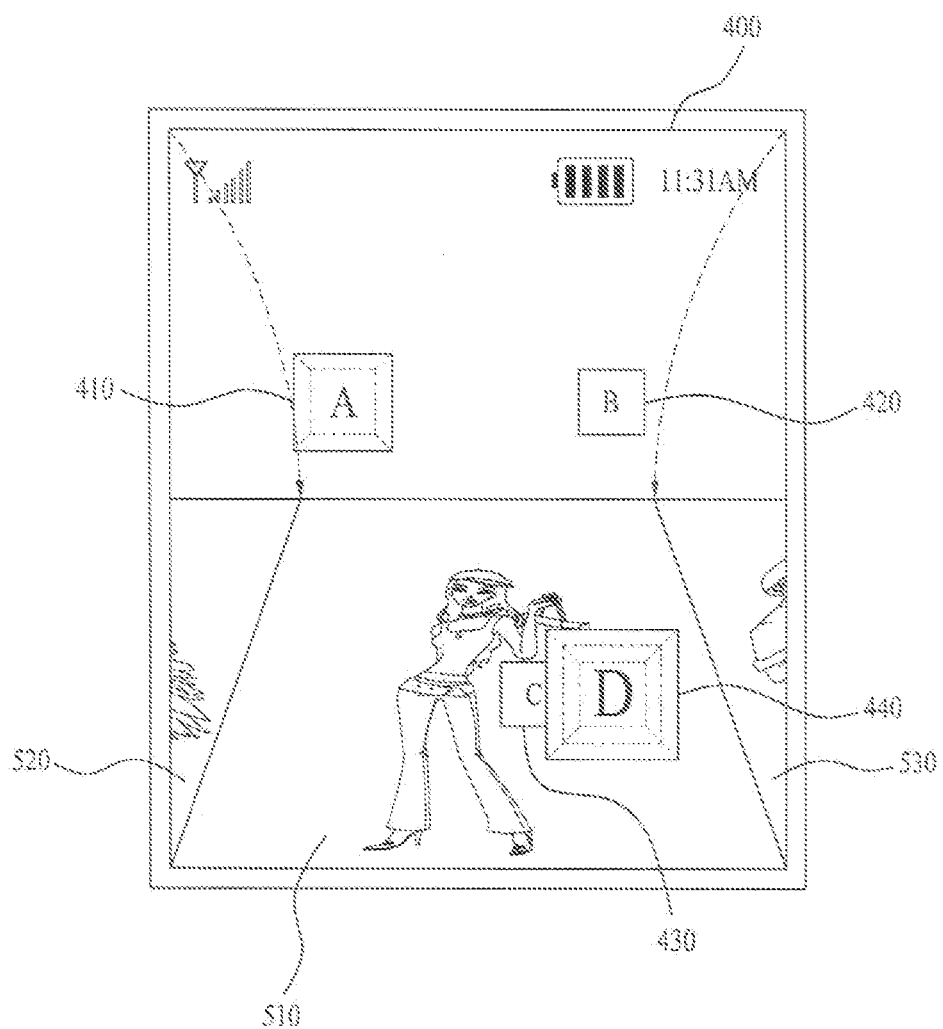
Figure 17C:
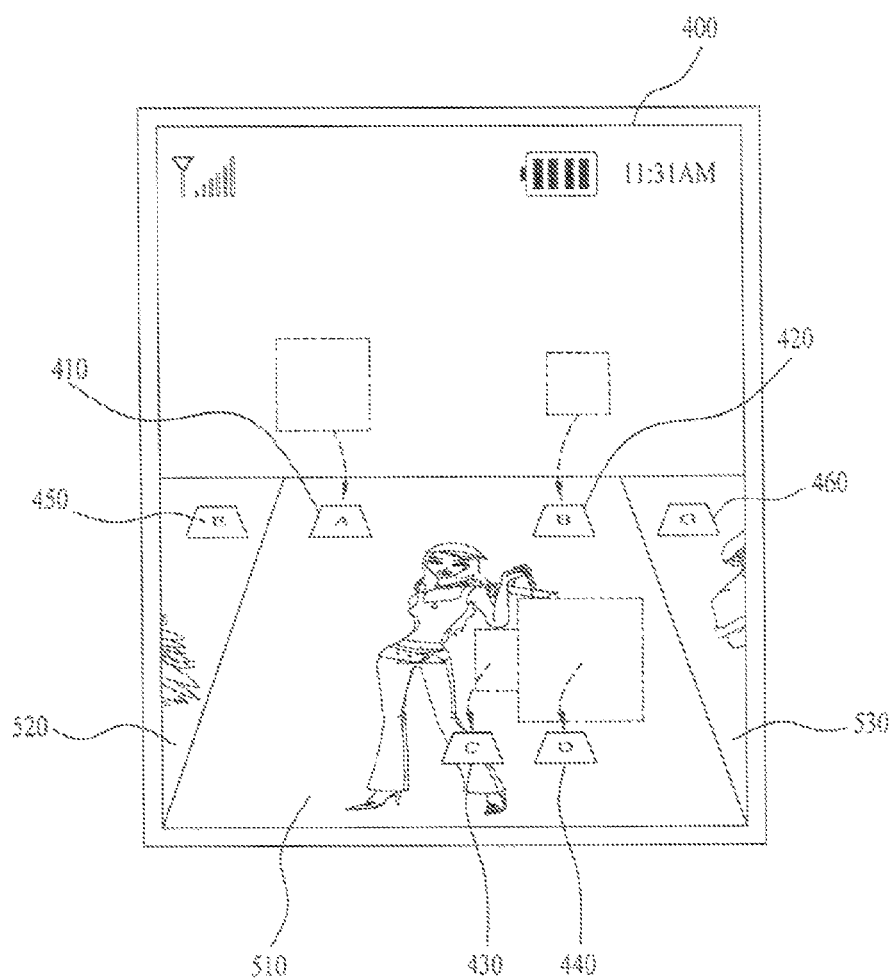

FIGS. 17A to 17C are diagrams of display screen configurations for a method of controlling a mobile terminal according an embodiment of the present invention.

Referring to FIG. 17A, the mobile terminal 100 s in the object use mode. And, as mentioned in the foregoing description, at least one or more objects can be displayed on the first background image 510 provided to the touchscreen 400.

The mobile terminal 100 is able to enter an object edit mode from the object use mode [S152]. Here, the object edit mode means the mode for a terminal user to remove at least one of the objects displayed on the standby screen or replace the at least one by other reserved object(s) in the mobile terminal 100.

The entry into the object edit mode can be performed by an appropriate user's manipulation on the user input unit 130. For example of the appropriate manipulation on the user input unit 130 for the entry into the object edit mode, referring to FIG. 17A, a double touch is performed on a vacant space of the first background image 510 displayed on the touchscreen 400, in which any object does not exist, by which the present invention is non-limited.

If so, the controller 180 is able to control the mobile terminal 100 to enter the object edit mode from the object use mode. As the mobile terminal 100 enters the object edit mode, referring to FIG. 17B, the first background image 510 on the touchscreen 400 can be inclined at the inclination angle against the plane of the touchscreen 400. That is, the first layer among the first to third layers can be inclined at the inclination angle against the plane of the touchscreen 400 only.

When the first background image 510 is displayed in a manner of being inclined at the inclination angle, a second background image 520 and a third background image 530 can be displayed on the left and right sides of the first background image 510, respectively. In this case, each of the second and third background images 520 and 530 can be a candidate image to substitute for the first background image 510 according to a selection made by a terminal user. Moreover, the first background image 510, the second background image 520 and the third background image 530 in the first layer can correspond to the first sublayer 610, the second sublayer 620 and the third sublayer 630 shown in FIG. 6B, respectively. How to replace the first background image 510 by the candidate image shall be described later in this disclosure.

When the first background image 510 is shifted to be 3-dimensionally displayed, the objects 410, 420, 430 and 440 on the touchscreen 400 can be maintained at original positions in the object use mode during a predetermined period of time.

After elapse of the predetermined period of time, referring to FIG. 17C, the objects 410, 420, 430 and 440 can be shifted along a prescribed trajectory to be brought into contact with the first background image 510 displayed with the inclination irrespective of the 3D depths of the objects 410, 420, 430 and 440 in the object use mode. In dong so, each of the second and third layers can be inclined at the inclination angle against the plane of the touchscreen 400 like the first layer.

FIG. 17C exemplarily shows that all of the shifted objects 410, 420, 430 and 440 are displayed in a manner of being completely brought into contact with the first background image 510, by which the present embodiment is non-limited. For instance, all of the shifted objects 410, 420, 430 and 440 can be displayed in the second or third layer inclined at the inclination angle in a manner of being spaced apart from the first background image 510 with a common space (or distance) in-between (not shown in the drawing).

Referring to FIG. 17C, the C object 430 and the D object 440, which have been displayed in a manner of being overlapped with each other in the object use mode, can be automatically and appropriately situated on the first background image (3D) 510 not to be overlapped with each other in the object edit mode.

In the object edit mode, when the objects, i.e., the A to D objects 410, 420, 430 and 440, are situated on the first background image 510, referring to FIG. 17C, at least one candidate object (e.g., the E object 450) can be situated on the second background image 520 and at least one candidate object (e.g., the G object 460) can be situated on the third background image 530. Moreover, all of the candidate objects are displayed in a manner of being fully brought into contact with the corresponding background image or being spaced apart from the corresponding background image with a common space in-between.

In the following description, how to remove the object previously displayed on the first background image in the object edit mode not to be further displayed on the first background image is explained in detail with reference to FIGS. 18A to 18D. The following description shall be made on the assumption that the objects are arranged in the first layer in the object edit mode like the first background image.

FIGS. 18A to 18D are diagrams of display screen configurations for a method of controlling a mobile terminal according an embodiment of the present invention.

Figure 18A:
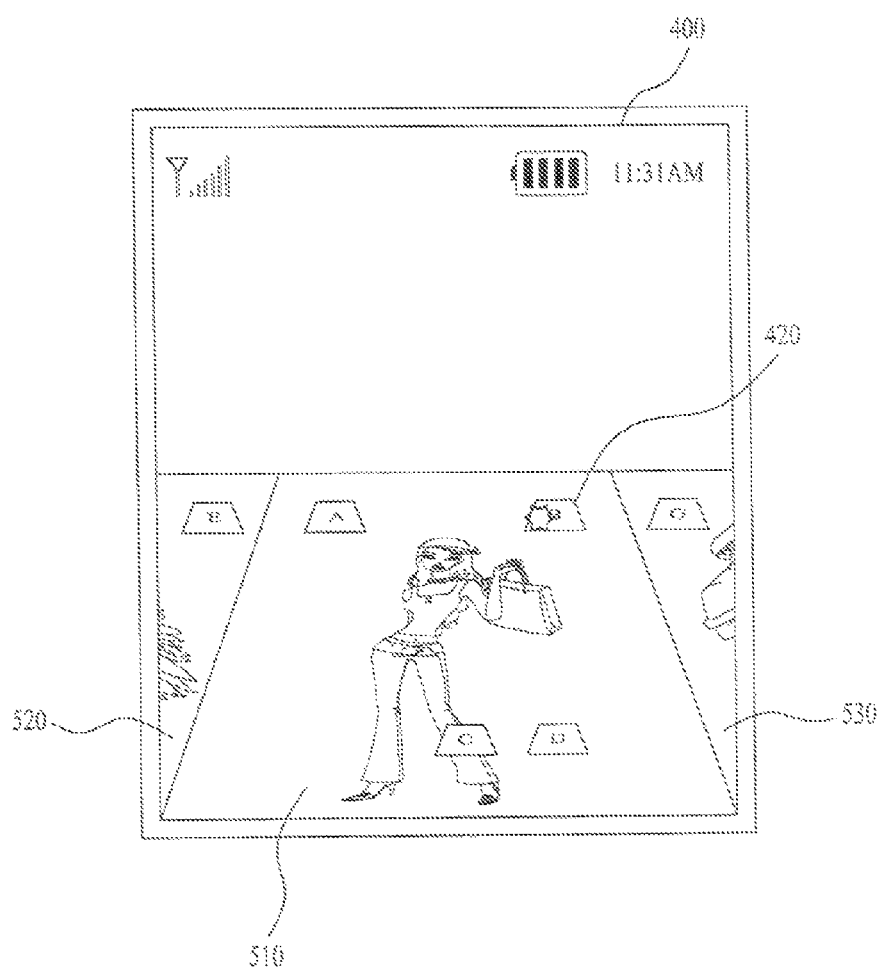
FIGS. 18A to 18D are diagrams of display screen configurations for a method of controlling a mobile terminal according an embodiment of the present invention.

Referring to FIG. 18A, one (e.g., the B object 420) of the objects adjacently displayed on the first background image 510 can be touched and selected.

Figure 18B:
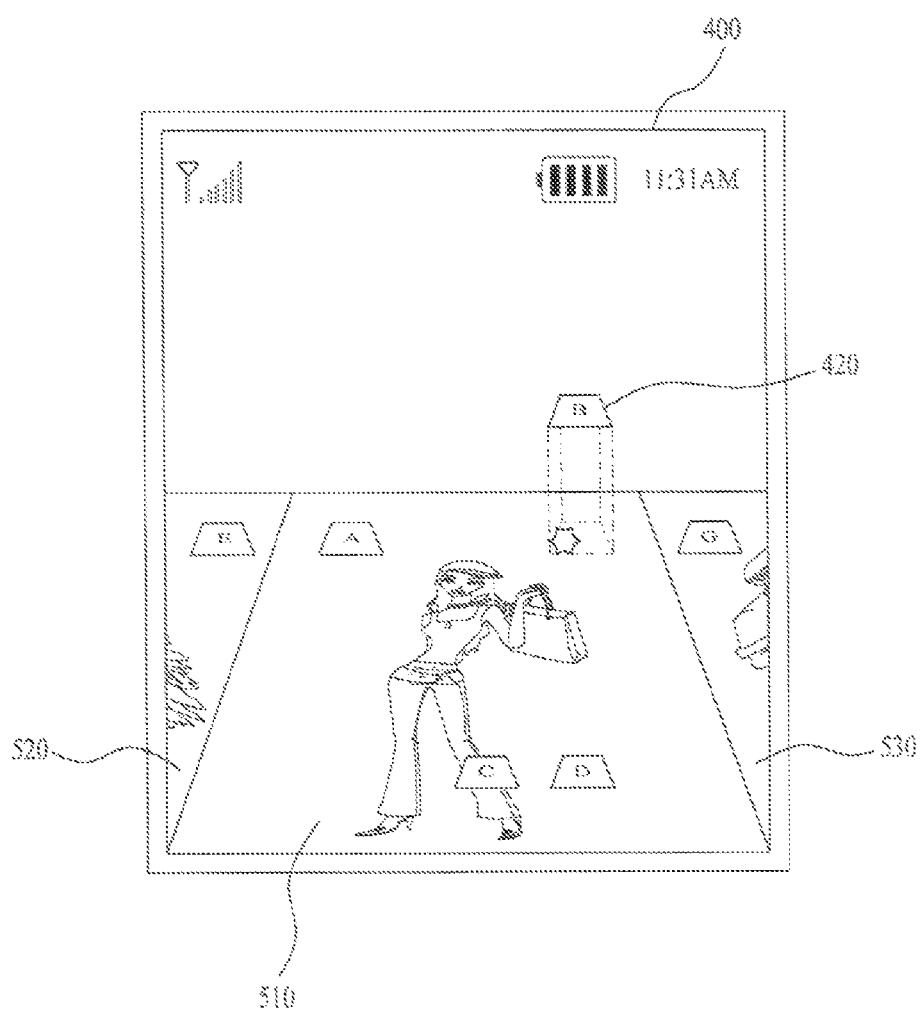

If so, referring to FIG. 18B, the controller 180 is able to control the selected B object 420 to be displayed as if flying (or floating) into the air over the first background image 510 in a manner of vertically ascending from the first layer to the second layer. While the touch is maintained, the selected B object 420 can keep flying into the air. If the B object 420 flies into the air, it can be understood as indicating that the B object 420 is correctly selected and gets ready to be shifted.

Figure 18C:
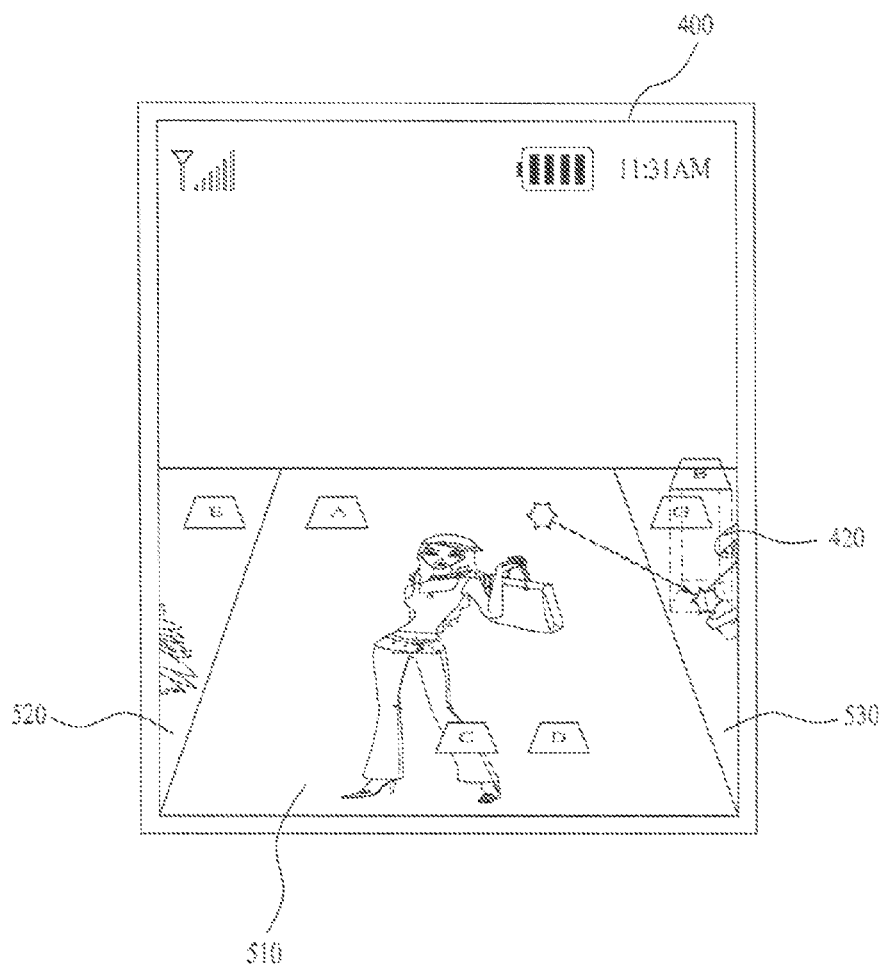

Referring to FIG. 18C, the touch can be shifted onto the third background image 530 from the 3-dimensionally displayed first background image 510. If so, the controller 180 is able to control the B object 420 to be shifted onto the third background image 530 by flying into the air along a shift trajectory of the touch.

Figure 18D:
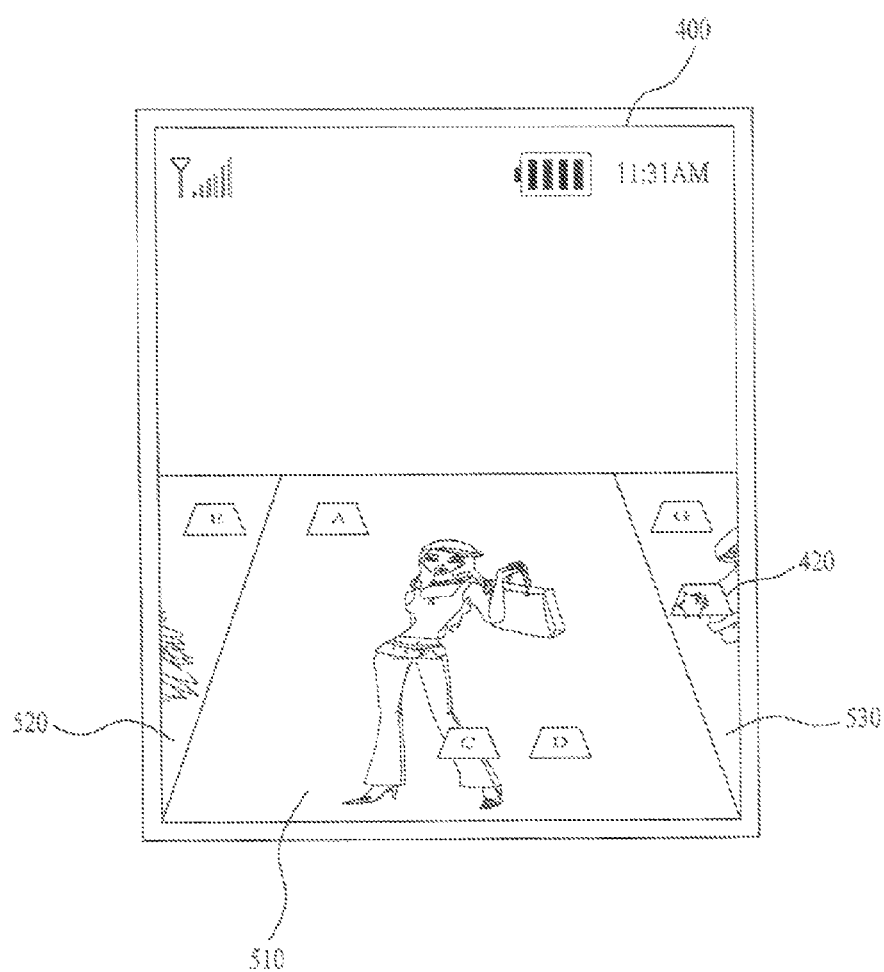

Referring to FIG. 18D, the touch can be released from the 3-dimensionally displayed third background image 530. If so, the controller 180 is able to control the B object 520 to be displayed at the touch-removed position in the third background image 530 in a manner of vertically descending down to the first layer from the second layer by finishing the flying in the air.

Thus, the B object 420 used to be displayed on the first background image 510 in the object edit mode is made not to be further displayed on the first background image 510.

In the following description, how to newly display an object, which was not previously displayed on the first background image in the object edit mode, on the first background image is explained in detail with reference to FIGS. 19A to 19E.

FIGS. 19A to 19E are diagrams of display screen configurations for a method of controlling a mobile terminal according an embodiment of the present invention.

Figure 19A:
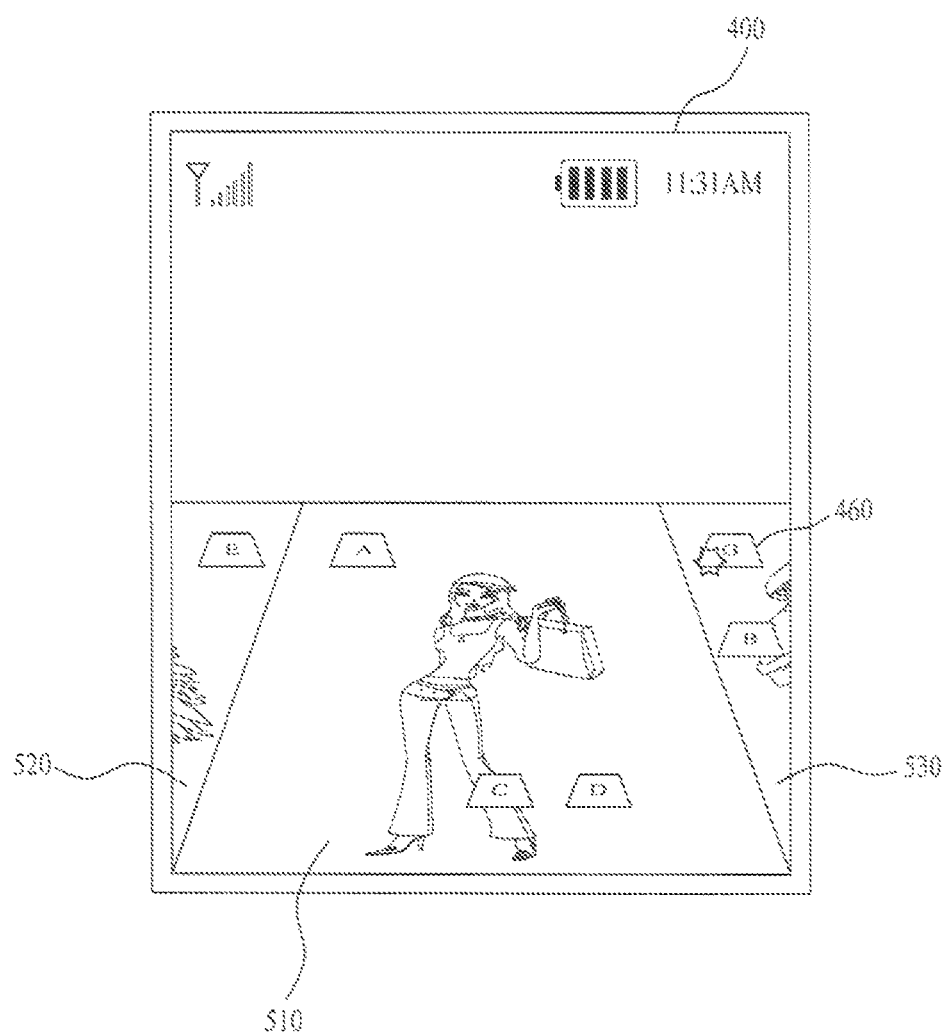
FIGS. 19A to 19E are diagrams of display screen configurations for a method of controlling a mobile terminal according an embodiment of the present invention.

Referring to FIG. 19A, one candidate object of the third background image 530 as the candidate image, i.e., the G object 460, can be touched and selected.

Figure 19B:
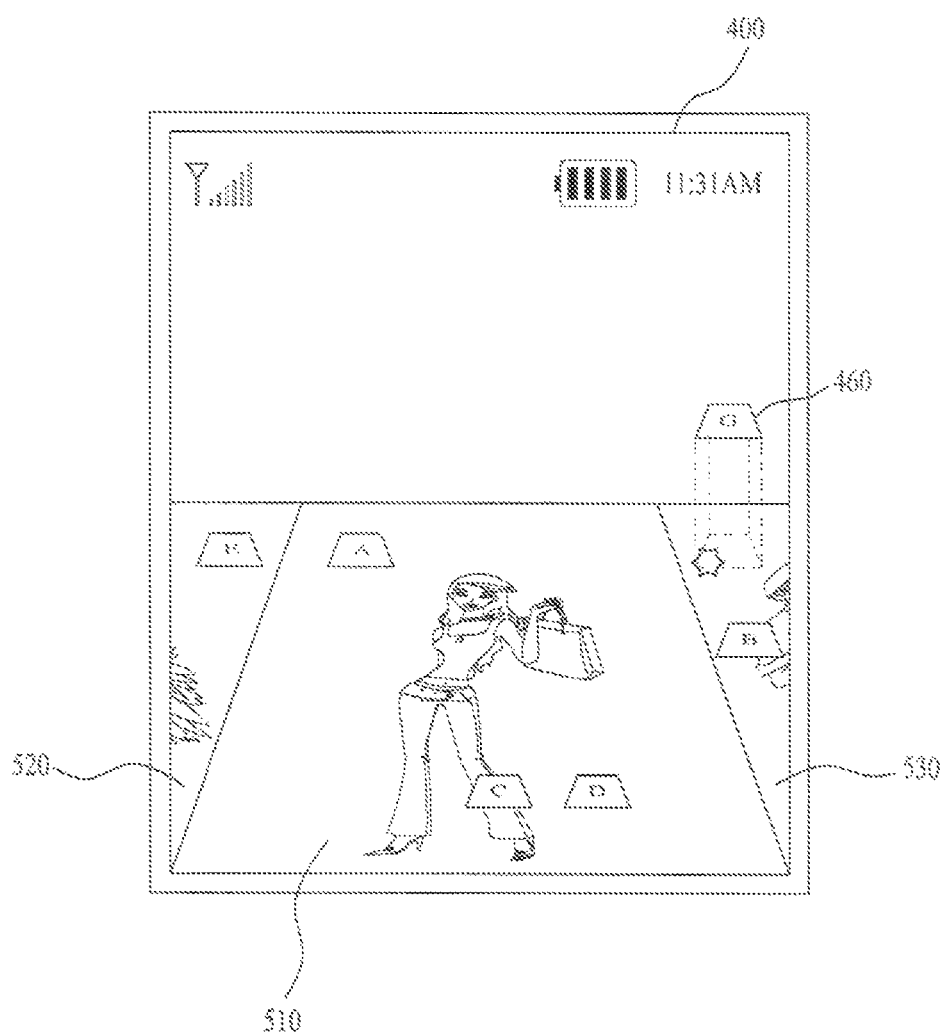

If so, referring to FIG. 19B, the controller 180 is able to control the selected G object 460 to be displayed as if flying into the air over the third background image 530 in a manner of vertically ascending from the first layer to the second layer. While the touch is maintained, the selected G object 460 can keep flying into the air.

Figure 19C:
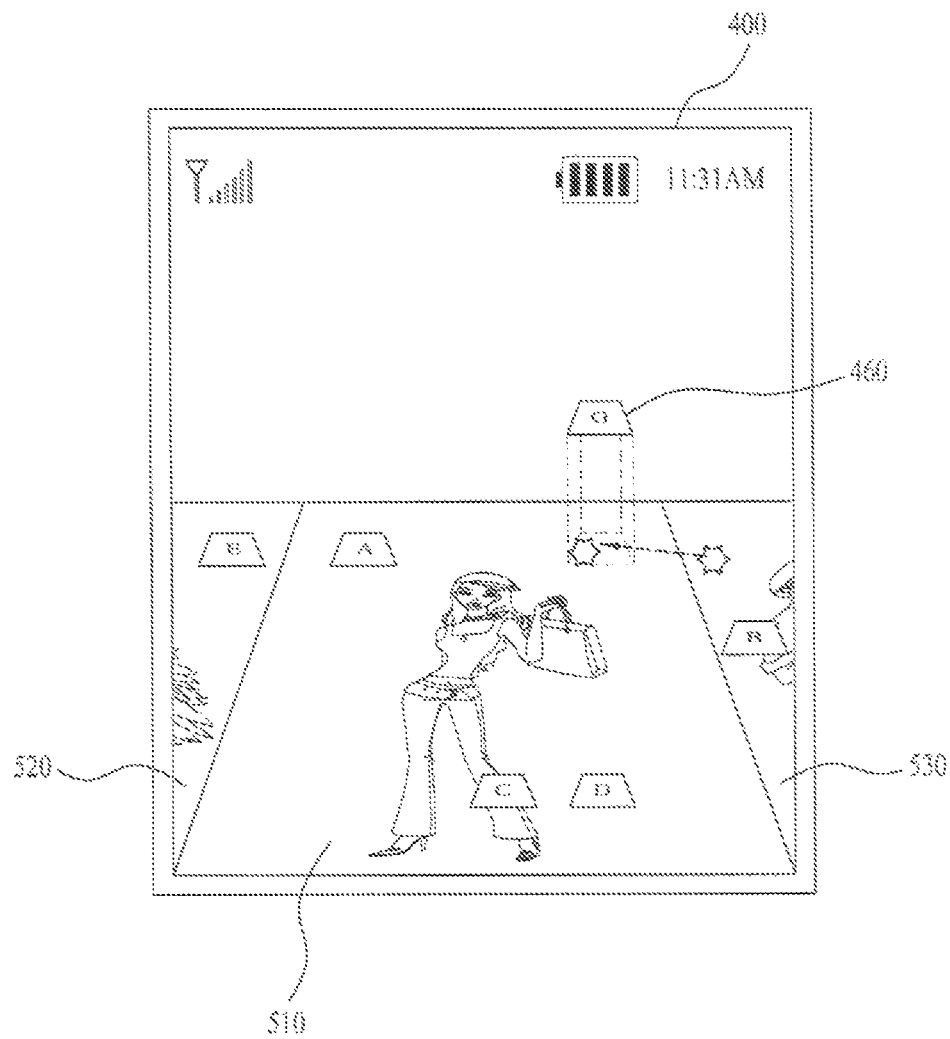

Referring to FIG. 19C, the touch can be shifted onto the first background image 510 from the 3-dimensionally displayed third background image 530. If so, the controller 180 is able to control the G object 460 to be shifted onto the first background image 510 by flying into the air along a shift trajectory of the touch.

Figure 19D:
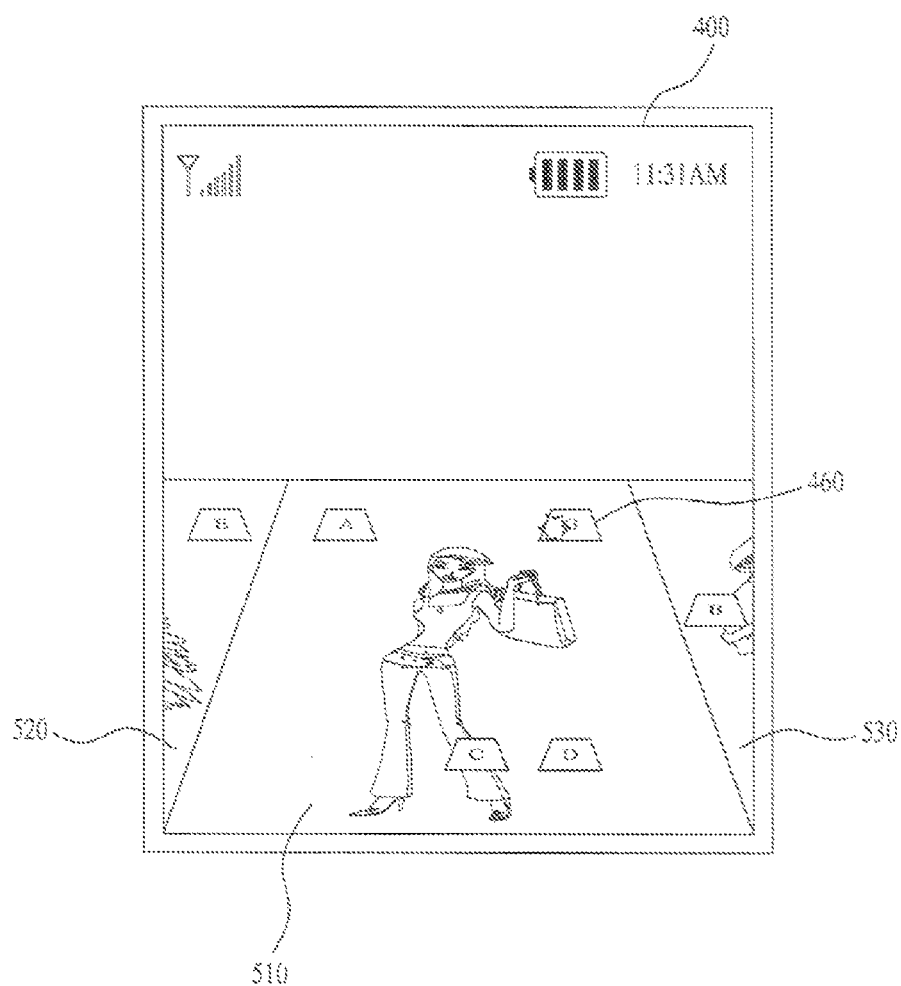
Figure 19E:
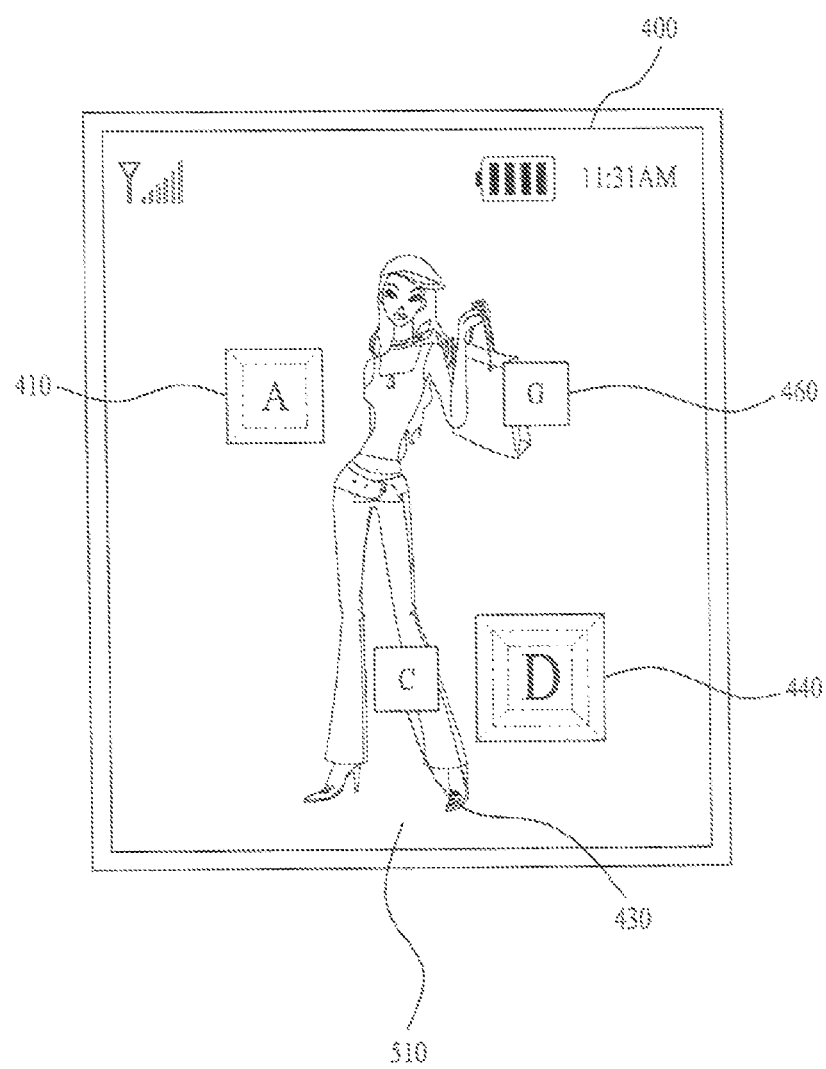

Referring to FIG. 19D, the touch can be removed from the 3-dimensionally displayed first background image 510. If so, the controller 180 is able to control the G object 560 to be displayed at the touch-removed position in the first background image 510 in a manner of vertically descending down to the first layer from the second layer by finishing the flying in the air.

Thus, the G object 460 not used to be displayed on the first background image 510 in the object edit mode can be newly displayed on the first background image 510.

After completion of the editing of the objects on the first background image 510, the mobile terminal 100 is able to return to the object use mode from the object edit mode. If the mobile terminal 100 returns to the object use mode, the first background image 510 keeps being displayed as the standby screen and the G object 460 can be displayed on the first background image 510 instead of the B object 420.

The entry into the object use mode can be performed by an appropriate user's manipulation on the user input unit 130. For example of the appropriate manipulation on the user input unit 130 for the entry into the object use mode, a double touch is performed on a vacant space of the first background image 510 displayed on the touchscreen 400, in which any object does not exist, by which the present invention is non-limited.

Through the processes described with reference to FIGS. 18A to 18D and FIGS. 19A to 19D, while the first background image 510 is maintained as the standby screen, the B object 420 can be replaced by the G object 460, by which the present embodiment is non-limited.

For instance, after the B object 420 has been removed from the first background image 510, the object use mode can be re-entered without substituting the G object 460 for the removed B object 420. For another instance, after the G object 460 has been added without removing the B object 420 from the first background image 510, the object use mode can be re-entered.

According to the foregoing description, when the mobile terminal 100 is in the object edit mode, while the first background image 510 is maintained as the standby screen, the objects for the standby screen are edited.

In the following description, when the mobile terminal 100 is in the object edit mode, how to edit the objects for the standby screen by substituting the first background image 510 with another background image (e.g., the third background image 530) as the standby screen is explained in detail with reference to FIGS. 20A to 20F.

FIGS. 20A to 20F are diagrams of display screen configurations for a method of controlling a mobile terminal according an embodiment of the present invention.

Figure 20A:
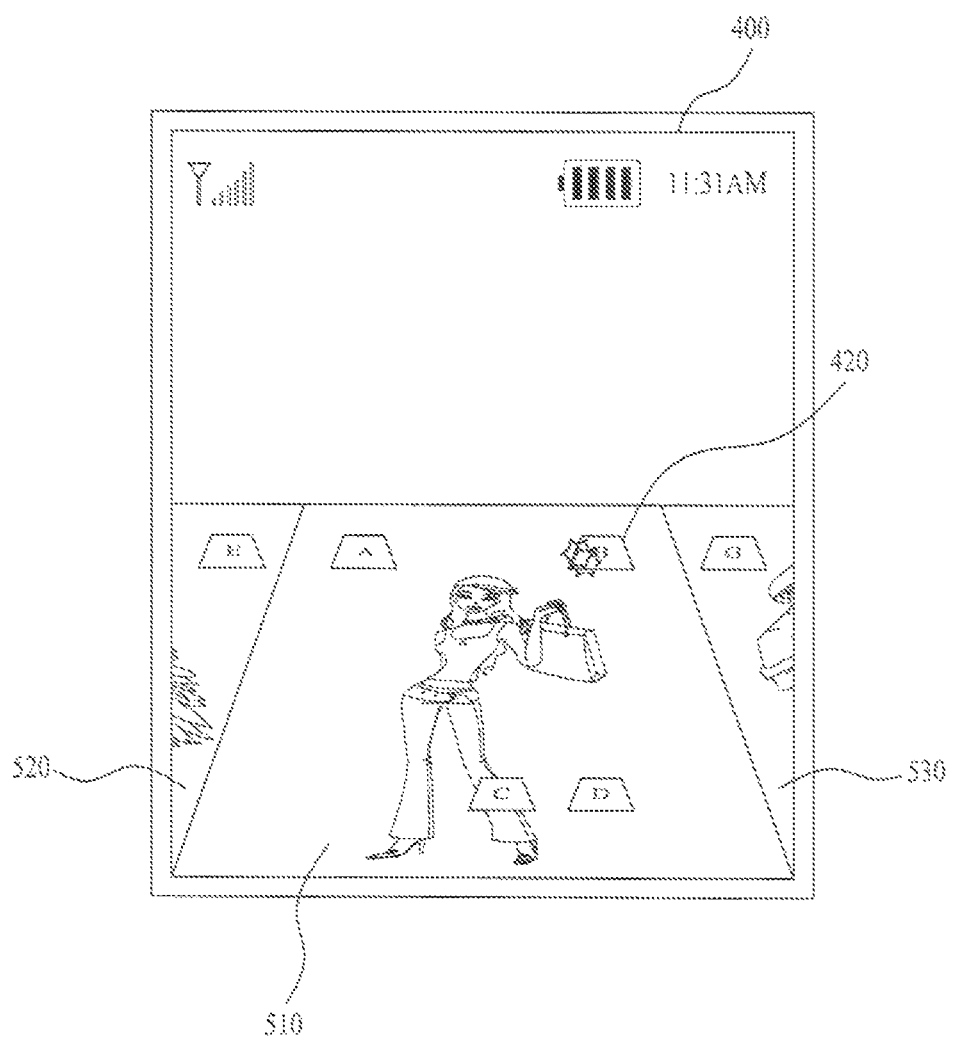
FIGS. 20A to 20F are diagrams of display screen configurations for a method of controlling a mobile terminal according an embodiment of the present invention.

Referring to FIG. 20A, one (e.g., the B object 420) of the objects adjacently displayed on the first background image 510 can be double touched and selected.

Figure 20B:
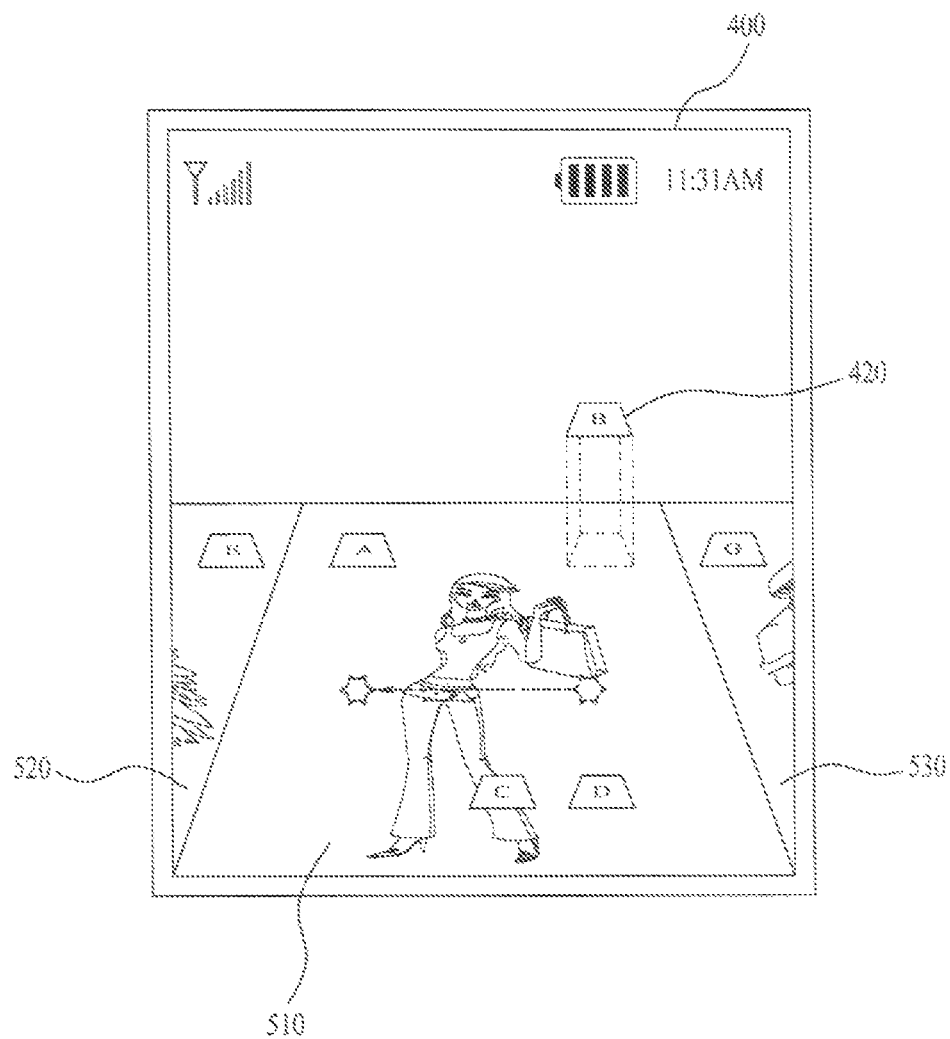

If so, referring to FIG. 20B, the controller 180 is able to control the selected B object 420 to be displayed on the first background image 510 as if flying into the air by vertically ascending from the first layer to the second layer.

According to the foregoing description with reference to FIGS. 18A to 18C, while the touch to the B object is maintained, the B object seems to keep flying in the air. Yet, in FIG. 20A and FIG. 20B, unlike FIGS. 18A to 18C, since the B object is double touched, even if the B object is released from the corresponding touch, the B object is able to keep flying in the air [S153].

When the B object flies into the air, the first background image 510 can be touched & dragged in a first direction (e.g., right to left).

Figure 20C:
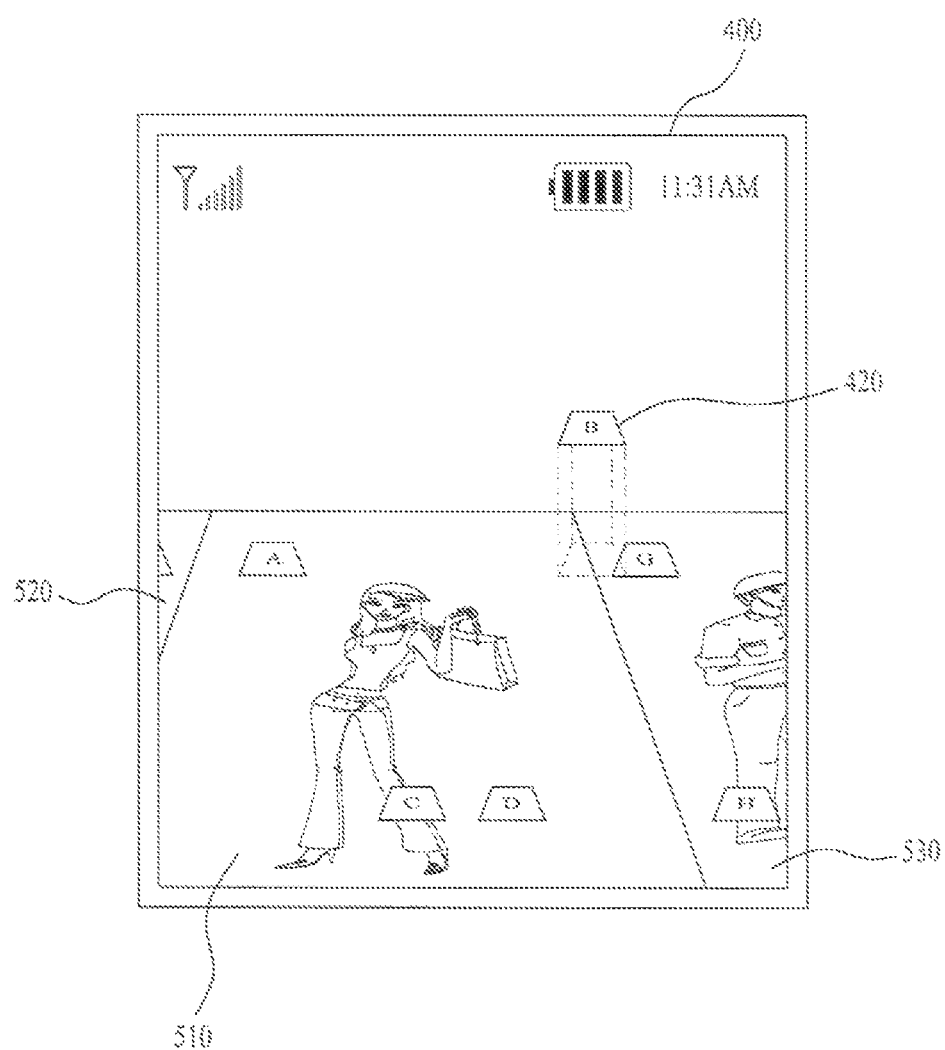
Figure 20D:
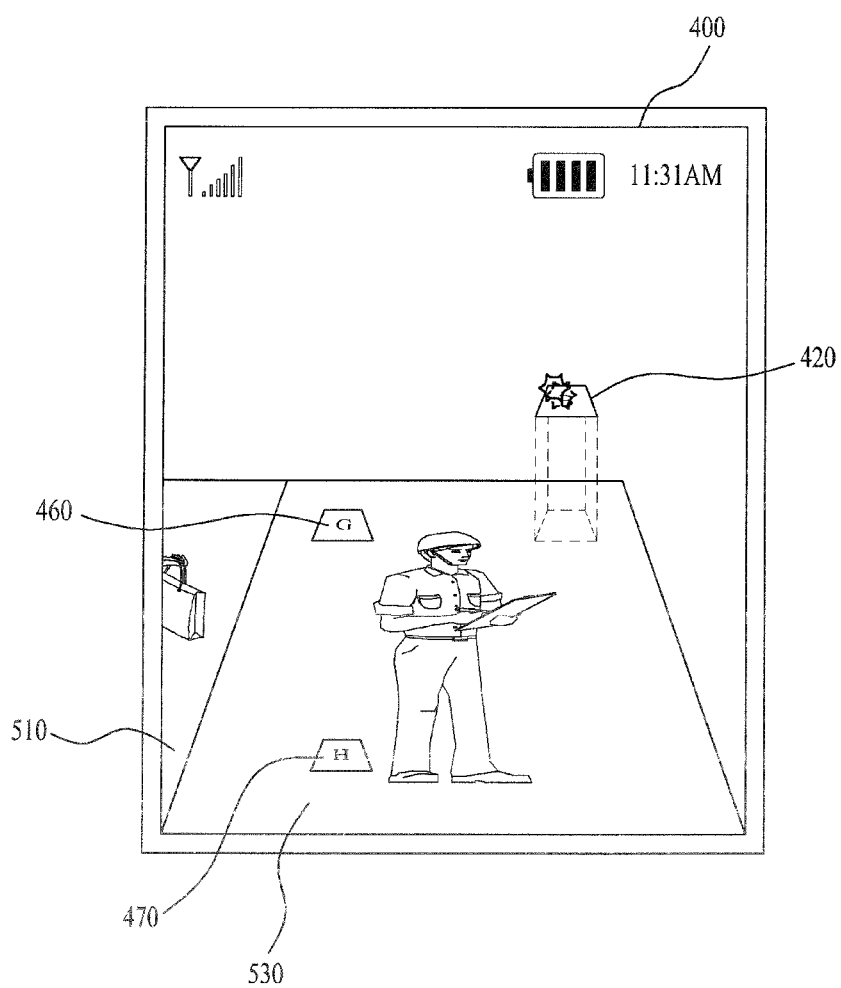
Figure 20E:
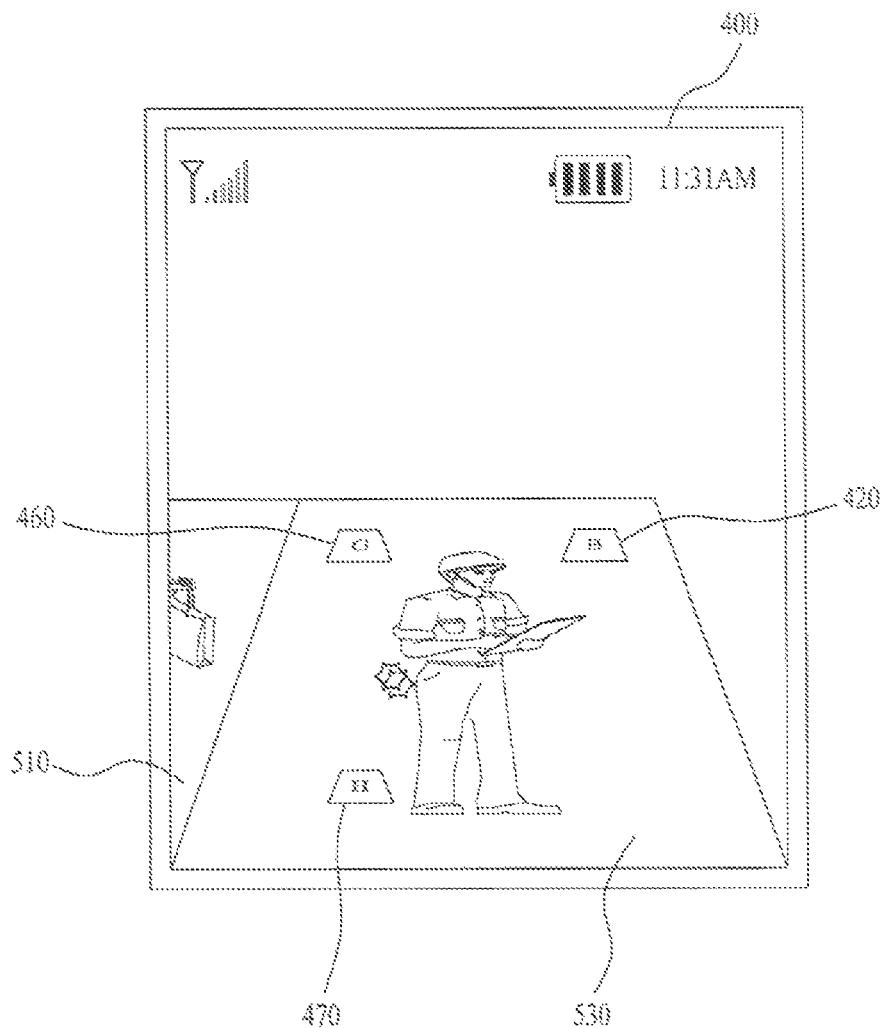

If so, referring to FIG. 20C and FIG. 20D, the controller 180 is able to control at least one portion of the first background image 510 to disappear from the touchscreen 400 in a manner that the first background image 510 is shifted toward one lateral side (e.g., a left side) from the center of the touchscreen 400 along the touched & dragged first direction [S154]. And, the controller 180 is able to control the whole third background image 530 to be displayed on the touchscreen 400 in a manner that the third background image 530 is shifted to the center of the touchscreen 400 from another lateral side (e.g., right side) of the touchscreen 400. Although FIG. 20D shows that there is no candidate image on the right side of the third background image 530, it is a matter of course that more candidate images can be displayed on the right side of the third background image 530 as well.

When the first background image 510 and the second background image 520 are shifted, the rest of the objects except the air-flying B object 420 can be shifted together with the first background image 510 and the third background image 530. Yet, the air-flying B object 420 can keep staying at the original position of the air flying irrespective of the shifts of the first and third background images 510 and 530 [S155]. In this case, the object shifted together in accordance with the shift of the background image can be named 'a dependent type object', while the object continuously staying at the original position irrespective of the shift of the background image can be named 'an independent type object'. As mentioned in the foregoing description, which one of the objects is the dependent type or the independent type can be determined by a selection made by a terminal user.

When the third background image 530 is displayed on the center of the touchscreen 400, the first and second background images 510 and 520 can stop being shifted. Therefore, the B object 420 can keep flying in the air on the third background image 530.

Subsequently, the B object 420 can be double touched again. If so, referring to FIG. 20E, the controller 180 is able to control the B object 420 to be displayed at a corresponding position on the third background image 530 in a manner of vertically descending from the second layer to the first layer by finishing the air flying. In particular, the B object 420 can be displayed on the third background image 530 together with the corresponding G and H objects 460 and 470. Since the third background image 530 is situated at the center of the touchscreen 400, the third background image 530 is not a candidate image anymore as well as the G and H objects 460 and 470 belonging to the third background image 530 are not candidate object anymore.

Instead, the first background image 510 having pushed away into one lateral side of the touchscreen 400 becomes the candidate image and the objects (i.e., the A object, the B object and the C object) belonging to the first background image 510 become the candidate objects as well.

Figure 20F:
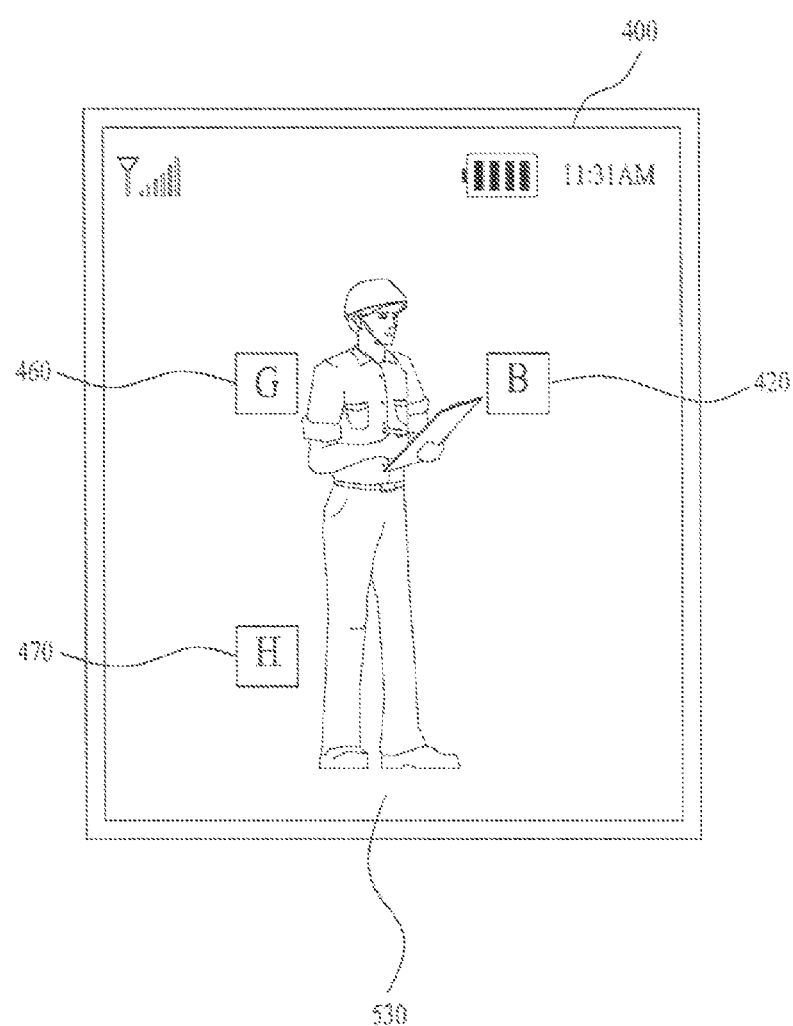

Referring to FIG. 20F, the mobile terminal 100 is able to return to the object use mode from the object edit mode. If the mobile terminal 100 returns to the object use mode, the third background image 530 is displayed as the standby screen and the B, G and H objects 420, 460 and 470 can be displayed on the third background image 530.

While the B object 420 is flying in the air on the third background image 530, as shown in FIG. 20D, even if the mobile terminal 100 returns to the object use mode from the object edit mode, referring to FIG. 20F, the third background image 530 is displayed as the standby screen and the B, G and H objects 420, 460 and 470 can be displayed on the third background image 530.

As mentioned in the foregoing description, the entry into the object use mode can be performed by an appropriate user's manipulation on the user input unit 130.

According to the above description, the independent type object flies into the air but the dependent type object does not fly into the air. Therefore, the independent type object and the dependent type object are displayed by being visually distinguished from each other, by which the present embodiment is non-limited. For instance, the independent type object and the dependent type object can be distinguished from each other according to at least one of color, size and shape. Moreover, the independent type object may not fly into the air but the dependent type object may fly into the air. Therefore, the independent type object and the dependent type object are displayed by being visually distinguished from each other.

Referring to FIGS. 20A to 20F, when a terminal user changes the first background image into the second background image as the standby screen in the object edit mode, the terminal user selects and enables a desired object in the first background image to fly into the air. Therefore, the selected object can be displayed on the first background image. Yet, an object, which is previously set to be necessarily displayed on the standby screen in the object edit mode, in the first background image can be set to fly into the air irrespective of a presence or non-presence of the terminal user's selection. This is explained in detail with reference to FIG. 21A and FIG. 21B as follows.

Figure 21A:
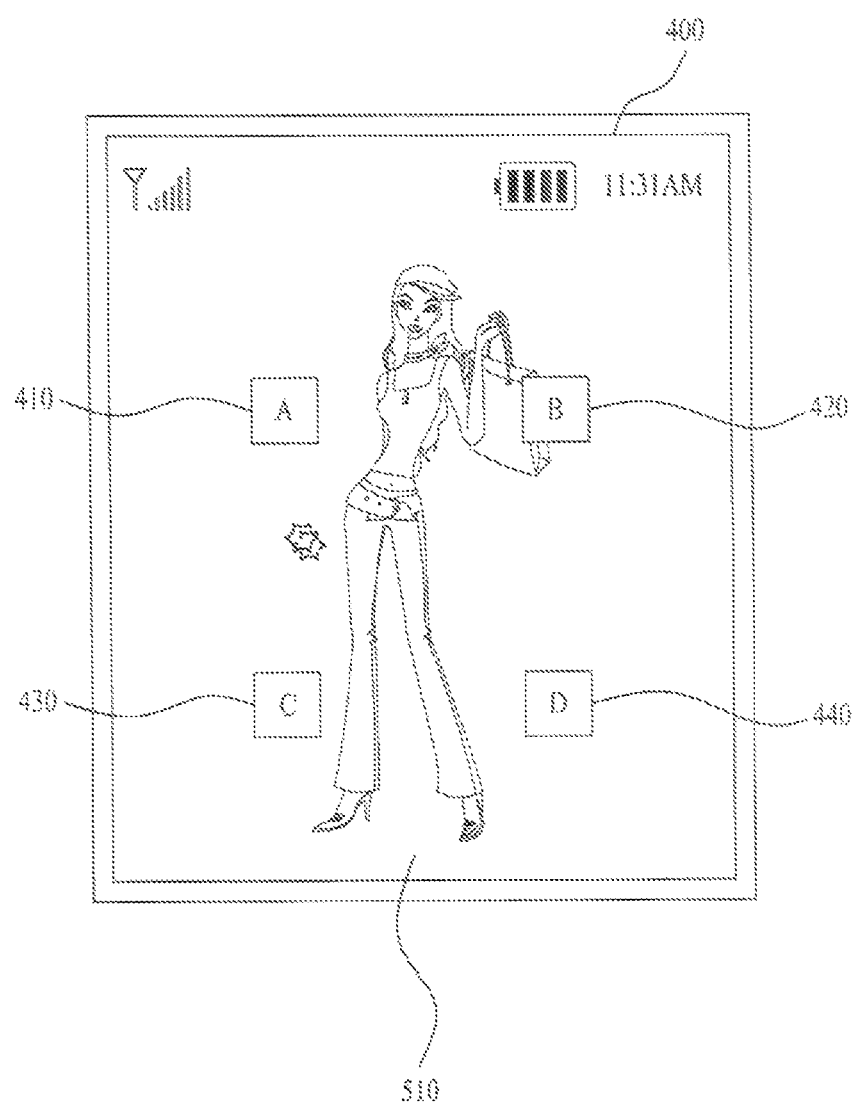
FIG. 21A and FIG. 21B are diagrams of display screen configurations for a method of controlling a mobile terminal according an embodiment of the present invention.
Figure 21B:
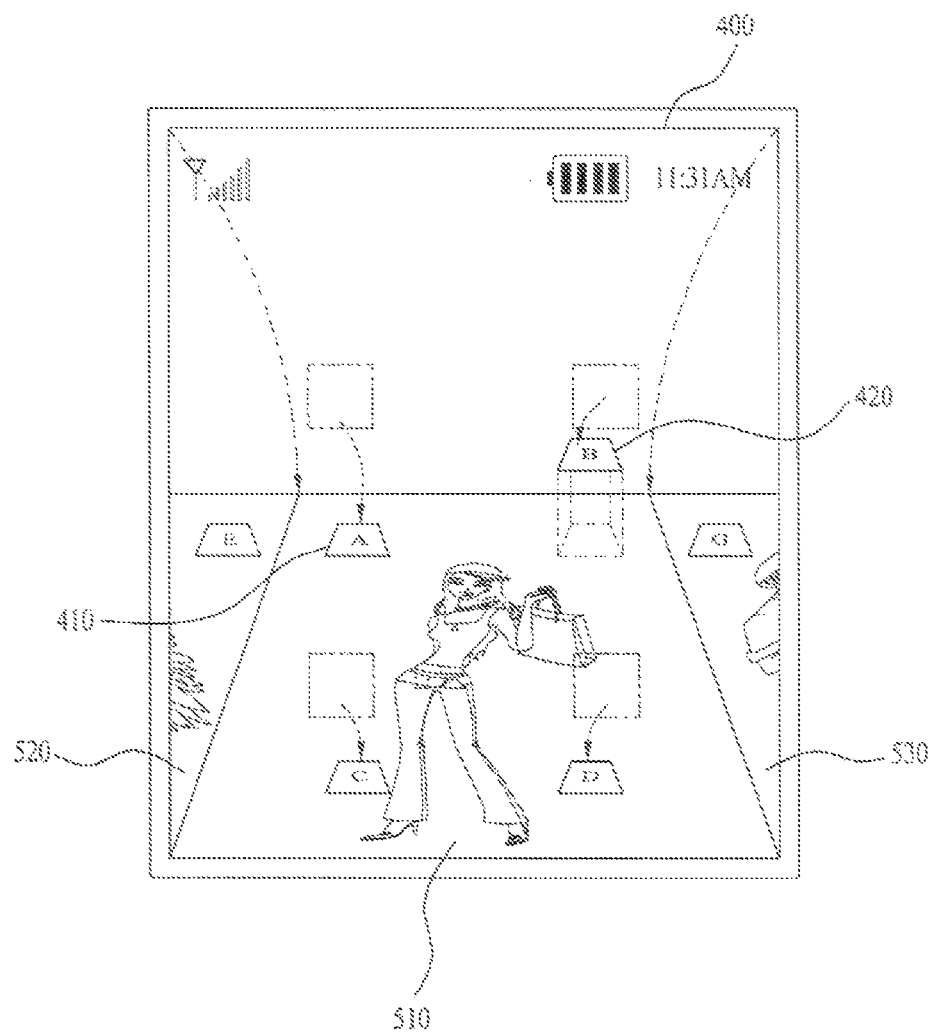

FIG. 21A and FIG. 21B are diagrams of display screen configurations for a method of controlling a mobile terminal according an embodiment of the present invention.

Referring to FIG. 21A, the mobile terminal 100 is in the object use mode. Therefore, as mentioned in the foregoing description, one or more objects 410, 420, 430 and 440 can be displayed in the first background image 510 on the touchscreen 400. Subsequently, as mentioned in the foregoing description, the mobile terminal 100 is able to enter the object edit mode from the object use mode.

As the mobile terminal 100 enters the object edit mode, referring to FIG. 21B, the first background image 510 can be shifted on the touchscreen 400 in a manner of being inclined at the inclination angle.

In doing so, an object (e.g., the B object 420), which is previously set to be necessarily displayed on the standby screen, has already flew into the air in advance irrespective of a presence or non-presence of a terminal user's selection in the object edit mode. Therefore, even if the first background image 510 is substituted with a different background image, the B object can keep flying into the air in the different background image. In particular, the B object can be previously set to an independent type before the selection of the terminal user in the object edit mode. And, the rest of the objects are dependent type objects. Yet, it is a matter of course that the rest of the object can be respectively set to the independent types by the terminal user's selection in the object edit mode if necessary.

Therefore, after the first background image 510 has been substituted with the different background image, when the mobile terminal 100 returns to the object use mode, the B object can keep being displayed on the different background image displayed as the standby screen.

Figure 22A:
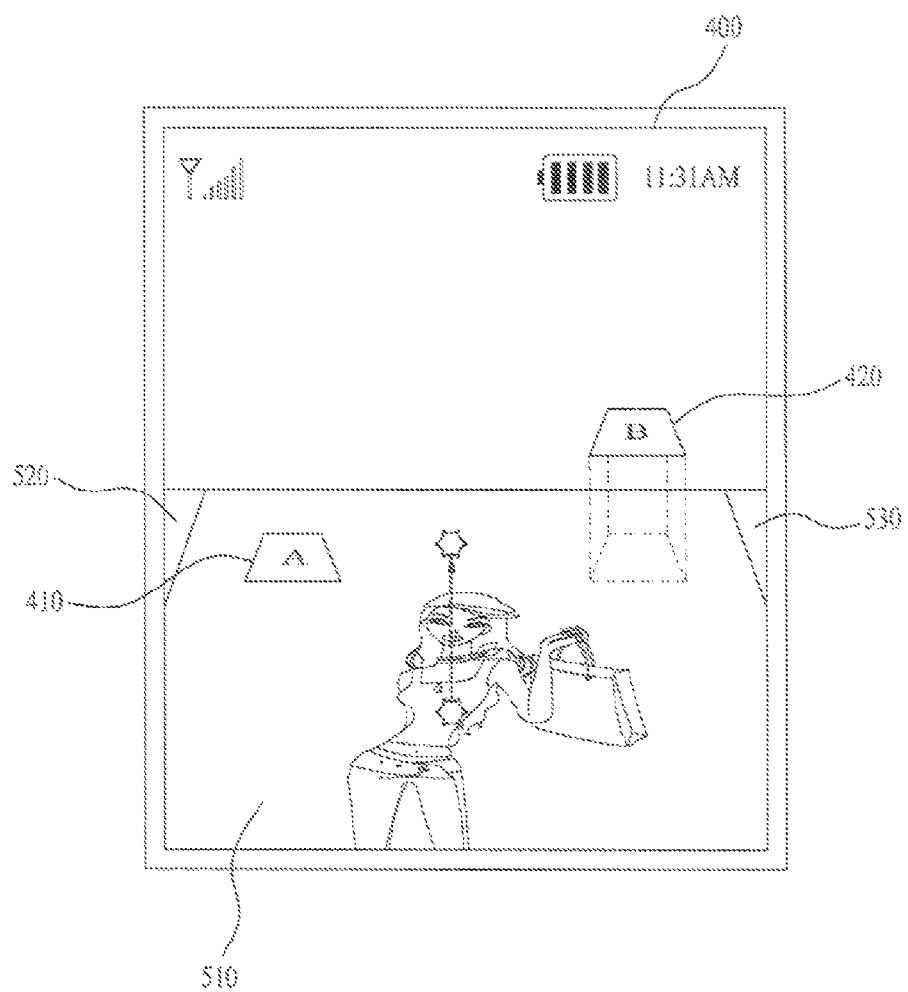
FIG. 22A and FIG. 22B are diagrams of display screen configurations for a method of controlling a mobile terminal according an embodiment of the present invention.
Figure 22B:
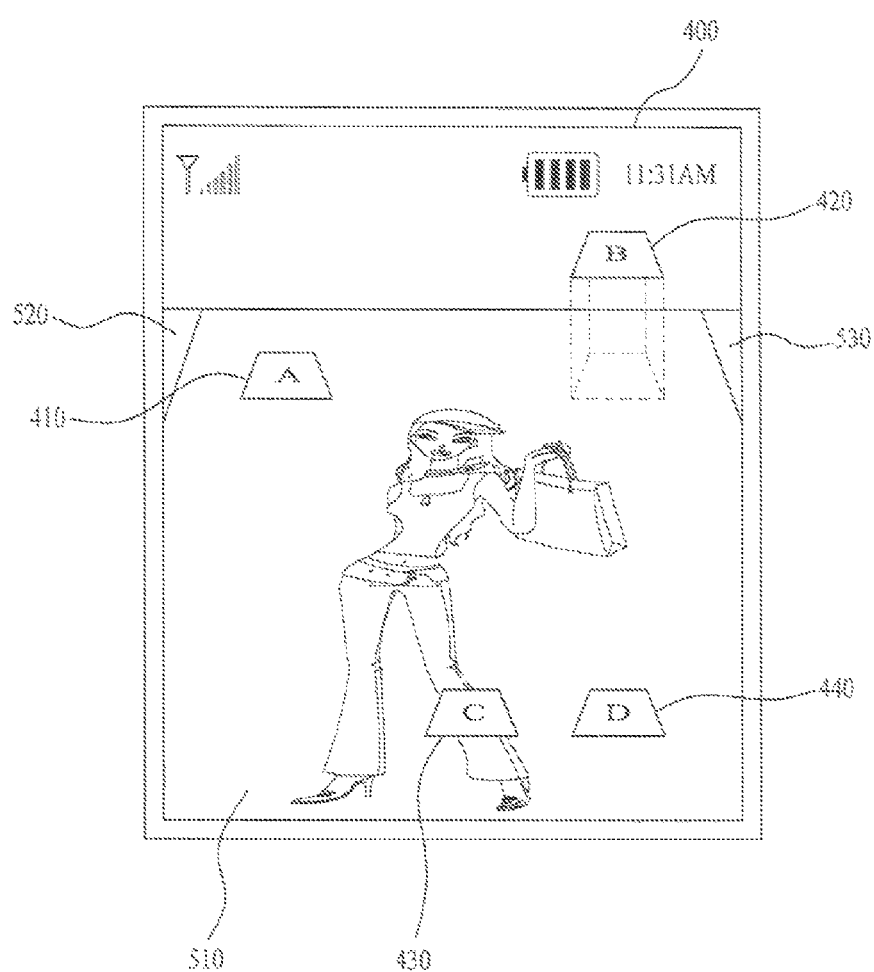

The following description is made with reference to FIG. 22A and FIG. 22B.

FIG. 22A and FIG. 22B are diagrams of display screen configurations for a method of controlling a mobile terminal according an embodiment of the present invention.

Referring to FIG. 22A, the mobile terminal 100 is in the object edit mode. And, the first background image 510 can be zoomed in and then displayed. The object 410 of the dependent type and the B object 420 of the independent type are displayed on the zoomed-in first background image 510.

Subsequently, the first background image 510 can be touched & dragged on the touchscreen 400 in a second direction (e.g., bottom to top) vertical to the first direction.

If so, referring to FIG. 22B, the controller 180 is able to control the first background image 510 and different candidate images 520 and 530 to be scrolled in the second direction. If the first background image 510 is touched & dragged in the second direction, the first background image 510 can be scrolled without being substituted with the different candidate image. Therefore, when the first background image 510 and the different background images 520 and 530 are scrolled in the second direction, the controller 180 is able to control both of the dependent type object (e.g., the A object 410) and the independent type object (e.g., the B object 420) to be scrolled in the second direction.

Accordingly, the present invention provides the following effects and/or advantages.

First of all, according to at least one of embodiments of the present invention, the present invention facilitates a mobile terminal to be manipulated via a 3D user interface. A user is facilitated to shift and copy an object in a manner of changing a 3D depth of the object and returning it to a previous status in the 3D user interface. The user is facilitated to shift and copy a plurality of objects in a manner of changing a 3D depth of each of the objects and returning the corresponding object to a previous status in the 3D user interface sequentially or simultaneously.

In particular, a terminal user is further facilitated to arrange a desired object at a desired position according to the terminal user's taste. For instance, an object displayed on a standby screen is facilitated not to be displayed on the standby screen. And, an object failing to be displayed on the standby screen is facilitated to be displayed on the standby screen.

Secondly, according to at least one of embodiments of the present invention, the present invention substitutes a background image used as a standby screen with a different background image as soon as adjusts arrangement of a desired object.

It will be apparent to those skilled in the art that the present invention can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example. And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a touchscreen configured to display a plurality of objects and display a first background image as a background of the plurality of objects, wherein each of the plurality of objects is moveable in the touchscreen; and
    a controller configured to:
        in response to a touch input for user selection of a specific object among the plurality of objects after an object edit mode is entered, control the specific object to be set to an independent type object and control another object of the plurality of objects to be set to a first dependent type object, wherein the specific object is displayed at a specific position on the touchscreen upon the user selection of the specific object, and
        in response to a first touch drag in a first direction performed with respect to the first background image after the touch input for the user selection of the specific object is released, control the first background image and the first dependent type object to be shifted on the touchscreen while controlling the independent type object to remain fixedly displayed at the same specific position on the touchscreen irrespective of the shift of the first background image and the first dependent type object,
    wherein the touchscreen is configured to display a three dimensional (3D) user interface, and
    wherein the controller is further configured to:
        display each of the plurality of objects at a different 3D depth according to whether it is a dependent type object or an independent type object,
        display both the specific object and the another object at a same first 3D depth before the user selection, and
        display the first dependent type object and the independent type object at the first 3D depth and a second 3D depth, respectively, after the user selection without any additional user input after the user selection.

2. The mobile terminal of claim 1, wherein the controller is configured to control a second background image to appear on the touchscreen as being shifted relative to the touchscreen as the first background image is shifted to disappear from the touchscreen.

3. The mobile terminal of claim 2, wherein, as the first background image is shifted to disappear from the touchscreen, the controller is configured to control the first dependent type object to disappear together with the first background image, and
    wherein, as a second background image is shifted to appear on the touchscreen, the controller is configured to control a second dependent type object to appear together with the second background image.

4. The mobile terminal of claim 3, wherein, as the second dependent type object appears together with the second background image, the controller is configured to control both the independent type object and the second dependent type object to be displayed together on the second background image.

5. The mobile terminal of claim 1, wherein the controller is configured to control the first dependent type object and the independent type object to be displayed so as to be visually distinguished from each other.

6. The mobile terminal of claim 1, wherein the controller is configured to control one of the first dependent type object and the independent type object to be displayed in a manner of being visually brought into contact with the first background image, and to control the other of the independent type object and the first dependent type object to be displayed in a manner of being visually spaced apart from the first background image.

7. The mobile terminal of claim 6,
    wherein, in response to a second touch and drag performed in a second direction with respect to the first background image, the controller is configured to control both the first dependent type object and the independent type object to be shifted together with the first background image.

8. The mobile terminal of claim 1, wherein the controller is configured to control a third one of the plurality of objects that is an object mandatorily displayed on the touchscreen to be set to an independent type object irrespective of the user selection.

9. The mobile terminal of claim 1, wherein the controller is configured to control a second background image to appear on the touchscreen as being shifted relative to the touchscreen as the first background image is shifted to disappear from the touchscreen,
    wherein, as the first background image is shifted to disappear from the touchscreen, the controller is configured to control the first dependent type object to disappear together with the first background image, and wherein, as the second background image is shifted to appear on the touchscreen, the controller is configured to control a second dependent type object to appear together with the second background image such that the second dependent type object at the first 3D depth is displayed together with the independent type object at the second 3D depth on the second background image.

10. The mobile terminal of claim 1, wherein the touchscreen is configured to provide a monoscopic or stereoscopic 3D image.

11. A method of controlling a mobile terminal, the method comprising:

displaying, on a touchscreen of the mobile terminal, a plurality of objects and displaying a background image as a background of the plurality of objects, wherein each of the plurality of objects is moveable in the touchscreen;

in response to a touch input for user selection of a specific object among the plurality of objects after an object edit mode is entered, controlling the specific object to be set to an independent type object and controlling another object of the plurality of objects to be set to a dependent type object, wherein the specific object is displayed at a specific position on the touchscreen upon the user selection of the specific object; and in response to a touch drag in a specific direction performed with respect to the background image after the touch input for the user selection of the specific object is released, controlling the background image and the dependent type object to be shifted on the touchscreen while controlling the independent type object to remain fixedly displayed at the same specific position on the touchscreen irrespective of the shift of the background image and the dependent type object, wherein the touchscreen is configured to display a three dimensional (3D) user interface, wherein each of the plurality of objects is displayed at a different 3D depth according to whether it is a dependent type object or an independent type object, wherein both the specific object and the another object are displayed at a same first 3D depth before the user selection, and wherein the first dependent type object and the independent type object are displayed at the first 3D depth and a second 3D depth, respectively, after the user selection without any additional user input after the user selection.

* * * * *